US010905113B2

(12) United States Patent
Aksan et al.

(10) Patent No.: US 10,905,113 B2
(45) Date of Patent: Feb. 2, 2021

(54) COMPOSITIONS AND METHOD FOR STORING LIQUID BIOSPECIMENS

(71) Applicant: REGENTS OF THE UNIVERSITY OF MINNESOTA, Minneapolis, MN (US)

(72) Inventors: Alptekin Aksan, Minneapolis, MN (US); Morwena Jane V. Solivio, Minneapolis, MN (US); Marcus Kramer, Minneapolis, MN (US); Rebekah Less, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 475 days.

(21) Appl. No.: 15/349,441

(22) Filed: Nov. 11, 2016

(65) Prior Publication Data

US 2017/0135333 A1    May 18, 2017

Related U.S. Application Data

(60) Provisional application No. 62/254,297, filed on Nov. 12, 2015.

(51) Int. Cl.
*A01N 1/02*    (2006.01)
(52) U.S. Cl.
CPC ......... *A01N 1/0221* (2013.01); *A01N 1/0231* (2013.01)
(58) Field of Classification Search
CPC .......................... A01N 1/0221; A01N 1/0231
See application file for complete search history.

(56) References Cited

U.S. PATENT DOCUMENTS

| | | | |
|---|---|---|---|
| 4,559,298 A | 12/1985 | Fahy | |
| 5,336,616 A | 8/1994 | Livesey | |
| 5,756,126 A | 5/1998 | Burgoyne | |
| 5,976,572 A | 11/1999 | Burgoyne | |
| 6,294,203 B1 | 9/2001 | Burgoyne | |
| 6,391,224 B1 | 5/2002 | Wowk | |
| 6,395,467 B1 | 5/2002 | Wowk | |
| 6,627,226 B2 | 9/2003 | Burgoyne | |
| 6,753,454 B1 | 6/2004 | Smith | |
| 6,821,479 B1 | 11/2004 | Smith | |
| 6,881,543 B2 | 4/2005 | Philpott | |
| 7,142,987 B2 | 11/2006 | Eggers | |
| 7,278,278 B2 | 10/2007 | Wowk | |
| D574,505 S | 8/2008 | Muller-Cohn | |
| 7,482,116 B2 | 1/2009 | Birnboim | |
| 7,498,133 B2 | 3/2009 | Fomovskaia | |
| 7,589,184 B2 | 9/2009 | Hogan | |
| 8,080,645 B2 | 12/2011 | Fischer | |
| 8,084,443 B2 | 12/2011 | Fischer | |
| 8,158,357 B2 | 4/2012 | Birnboim | |
| 8,183,233 B2 | 5/2012 | Kipp | |
| 8,221,381 B2 | 7/2012 | Muir | |
| 8,283,165 B2 | 10/2012 | Hogan | |
| 8,293,467 B2 | 10/2012 | Fischer | |
| 8,394,642 B2 | 3/2013 | Jovanovich | |
| 8,435,943 B2 | 5/2013 | Garigapati | |
| 8,679,735 B2 | 3/2014 | Fahy | |
| 9,399,082 B2 | 7/2016 | Bowlin | |
| 2002/0051963 A1 | 5/2002 | Bronshtein | |
| 2004/0077708 A1 | 4/2004 | Grahek | |
| 2009/0130756 A1 | 5/2009 | Klann | |
| 2009/0291427 A1 | 11/2009 | Muller-Cohn | |
| 2009/0298132 A1 | 12/2009 | Muller-Cohn | |
| 2009/0312285 A1 | 12/2009 | Fischer | |
| 2010/0099149 A1 | 4/2010 | Birnboim | |
| 2010/0167376 A1 | 7/2010 | Hogan | |
| 2010/0173392 A1 | 7/2010 | Davis | |
| 2010/0178210 A1 | 7/2010 | Hogan | |
| 2010/0209957 A1 | 8/2010 | Hogan | |
| 2010/0218623 A1 | 9/2010 | Eggers | |
| 2010/0248363 A1 | 9/2010 | Hogan | |
| 2010/0273218 A1 | 10/2010 | Birnboim | |
| 2011/0005932 A1 | 1/2011 | Jovanovich | |
| 2011/0014658 A1 | 1/2011 | Birnboim | |
| 2011/0081363 A1 | 4/2011 | Whitney | |
| 2011/0281754 A1 | 11/2011 | Fischer | |
| 2012/0052572 A1 | 3/2012 | Whitney | |
| 2012/0061392 A1 | 3/2012 | Beach | |
| 2012/0088231 A1 | 4/2012 | Fischer | |

(Continued)

FOREIGN PATENT DOCUMENTS

| | | |
|---|---|---|
| EP | 1032647 A1 | 9/2000 |
| EP | 2195466 B1 | 10/2012 |

(Continued)

OTHER PUBLICATIONS

Aksan, Alptekin, and Mehmet Toner. "Isothermal Desiccation and Vitrification Kinetics of Trehalose-Dextran Solutions." Langmuir 20.13 (2004): 5521-5529.*

Ritcharoen, Watadta, et al. "Electrospun dextran fibrous membranes." Cellulose 15.3 (2008): 435-444.*

Less, Rebekah, et al. "Isothermal vitrification methodology development for non-cryogenic storage of archival human sera." Cryobiology 66.2 (2013): 176-185.*

Wang, Wei. "Lyophilization and development of solid protein pharmaceuticals." International journal of pharmaceutics 203.1-2 (2000): 1-60.*

Costantino, Henry R., Robert Langer, and Alexander M. Klibanov. "Aggregation of a lyophilized pharmaceutical protein, recombinant human albumin: effect of moisture and stabilization by excipients." Bio/Technology 13.5 (1995): 493-496.*

(Continued)

*Primary Examiner* — Bethany P Barham
*Assistant Examiner* — Peter Anthopolos
(74) *Attorney, Agent, or Firm* — Mueting Raasch Group

(57) ABSTRACT

This disclosure describes a lyoprotectant matrix, compositions including the lyoprotectant matrix and methods for storing a liquid biospecimen using the lyoprotectant matrix. Generally, the lyoprotectant matrix includes a non-woven web having fibers having, as components, at least one lyoprotective carbohydrate and at least one polymer. The matrix further possesses an apparent pore size of 0.1 μm to 500 μm.

5 Claims, 8 Drawing Sheets

(56) References Cited

U.S. PATENT DOCUMENTS

| | | |
|---|---|---|
| 2012/0100522 A1 | 4/2012 | Saghbini |
| 2012/0100529 A1 | 4/2012 | Fischer |
| 2012/0138862 A1 | 6/2012 | Hogan |
| 2012/0308987 A1 | 12/2012 | Hogan |
| 2012/0315635 A1 | 12/2012 | Vangbo |
| 2013/0025691 A1 | 1/2013 | Muir |
| 2013/0040288 A1 | 2/2013 | Fischer |
| 2015/0176056 A1* | 6/2015 | Li .................. C12Q 1/6806 435/6.12 |

FOREIGN PATENT DOCUMENTS

| | | |
|---|---|---|
| EP | 2505213 A2 | 10/2012 |
| WO | WO 1999027071 A1 | 6/1999 |
| WO | WO 2006090150 A1 | 8/2006 |
| WO | WO 2010042647 A2 | 4/2010 |

OTHER PUBLICATIONS

Dai, Minhui, Andre Senecal, and Sam R. Nugen. "Electrospun water-soluble polymer nanofibers for the dehydration and storage of sensitive reagents." Nanotechnology 25.22 (2014): 225101.*

Aksan, "Analysis of desiccation and vitrification characteristics of carbohydrate films by shear-wave resonators" 2005 Langmuir, 21(7):2847-54.

Aksan, "Desiccation kinetics of biopreservation solutions in microchannels" 2006 Journal of Applied Physics, 99:064703.

Aksan, "Isothermal desiccation and vitrification kinetics of trehalose-dextran solutions" 2004 Langmuir, 20(13):5521-9.

Aksan, "Roles of Thermodynamic State and Molecular Mobility in Biopreservation" in The Biomedical Engineering Handbook, J.D. Bronzino, Editor. Taylor & Francis: Boca Raton, 2006. Cover page, publisher's page, and pp. 41.1-41.20.

Anchordoquy, "Polymers protect lactate dehydrogenase during freeze-drying by inhibiting dissociation in the frozen state" Aug. 1996 Archives of Biochemistry and Biophysics, 332(2):231-238.

Anchordoquy, "Maintenance of quaternary structure in the frozen state stabilizes lactate dehydrogenase during freeze-drying" 2001 Archives of Biochemistry and Biophysics, 390(1):35-41.

Andersen, "Identification of candidate biomarkers in ovarian cancer serum by depletion of highly abundant proteins and differential in-gel electrophoresis" Dec. 2010 Electrophoresis, 31(4):599-610.

Anderson, "The human plasma proteome: history, character, and diagnostic prospects" Nov. 2002 Mol Cell Proteomics, 1(11):845-67.

Angell, "Liquid Fragility and the Glass Transition in Water and Aqueous Solutions" 2002 Chemical Reviews, 102(8):2627-2650.

Arakawa, "Preferential interactions of proteins with salts in concentrated solutions" Dec. 1982 Biochemistry, 21(25):6545-6552.

Arakawa, "Protection of bovine serum albumin from aggregation by tween 80" May 2000 Journal of Pharmaceutical Sciences, 89(5):646-651.

Armstrong, "Serum lactate dehydrogenase (LDH) as a biomarker for survival with mTor inhibition in patients with metastatic renal cell carcinoma (RCC)" May 2010 Journal of Clinical Oncology, 28(15).

Atochina-Vasserman, "Alterations in Multimeric Structure of Surfactant Protein D As A Biomarker for Lung Injury and Inflammation in Humans" 2010 American Journal of Respiratory and Critical Care Medicine, 181.

Aziz, "Analytical performance of a highly sensitive C-reactive protein-based immunoassay and the effects of laboratory variables on levels of protein in blood" Jul. 2003 Clin Diagn Lab Immunol, 10(4):652-7.

Bakaltcheva, "Freeze-dried whole plasma: Evaluating sucrose, trehalose, sorbitol, mannitol and glycine as stabilizers" 2007 Elsevier health journals, 105-116.

Bhatnagar, "Post-thaw aging affects activity of lactate dehydrogenase" Jun. 2005 J Pharm Sci, 94(6):1382-8.

Bhatnagar, "Protein stability during freezing: Separation of stresses and mechanisms of protein stabilization" 2007 Pharmaceutical Develop. and Tech., 12(5):505-523.

Biomatrica SalivaGard™ DNA. Online: http://biomatrica.com/salivagard-dna.php.

Bosca, "Modulation of muscle phosphofructokinase at physiological concentration of enzyme" Feb. 1985 J Biol Chem, 260(4):2100-7.

Cao, "Effect of freezing and thawing rates on denaturation of proteins in aqueous solutions" Jun. 2003 Biotechnol Bioeng, 82(6):684-90.

Carpenter, "Separation of freezing- and drying-induced denaturation of lyophilized proteins using stress-specific stabilization. I. Enzyme activity and calorimetric studies" Jun. 1993 Arch Biochem Biophys, 303(2):456-64.

Cataland, "Biomarkers of terminal complement activation confirm the diagnosis of aHUS and differentiate aHUS from TTP" Jun. 2014 Blood, 123(24):3733-8.

Chaigneau, "Serum biobank certification and the establishment of quality controls for biological fluids: examples of serum biomarker stability after temperature variation" 2007 Clin Chem Lab Med 45 (2007):1390-5.

Cicchillitti, "Characterisation of a multimeric protein complex associated with ERp57 within the nucleus in paclitaxel-sensitive and -resistant epithelial ovarian cancer cells: The involvement of specific conformational states of beta-actin" 2010 International Journal of Oncology, 37(2):445-454.

Cicerone, "Fast dynamics and stabilization of proteins: binary glasses of trehalose and glycerol" 2004 Biophys J, 86(6):3836-45.

Cicerone, "Substantially Improved Stability of Biological Agents in Dried Form" 2003 Bioprocess International, 36-47.

Cohen, "Ice-induced partial unfolding and aggregation of an integral membrane protein" Nov. 2010 Biochimica Et Biophysica Acta-Biomembranes, 1798(11):2040-2047.

Costantino, "Aggregation of a lyophilized pharmaceutical protein, recombinant human albumin: effect of moisture and stabilization by excipients" May 1995 Biotechnology (NY), 13(5):493-6.

Dalkin, "Derivation and Application of Upper Limits for Prostate-Specific Antigen in Men Aged 50-74 Years with No Clinical-Evidence of Prostatic-Carcinoma" 1995 British Journal of Urology, 76(3):346-350.

DNAgard® Blood, Biomatrica. Online: http://biomatrica.com/dnagardblood.php.

El Demery, "Serum Matrix Metalloproteinase-7 is an independent prognostic biomarker in advanced bladder cancer" 2014 Clin Transl Med, 3:31.

Engwegen, "Influence of variations in sample handling on SELDI-TOF MS serum protein profiles for colorectal cancer" 2008 Proteomics Clin Appl, 2(6):936-45.

Fahy, "Vitrification as an approach to cryopreservation" Aug. 1984 Cryobiology, 21(4):407-26.

Farruggia, "Thermal features of the bovine serum albumin unfolding by polyethylene glycols" Oct. 1999 Int J Biol Macromol, 26(1):23-33.

GenTegra™ DNA.

Girg, "The dimeric intermediate on the pathway of reconstitution of lactate dehydrogenase is enzymatically active" Oct. 1983 FEBS Lett, 163(1):132-5.

Gogas, "Biomarkers in melanoma" 2009 Ann Oncol, 20 Suppl 6:vi8-13.

Greiff, "Cryotolerance of enzymes. I. Freezing of lactic dehydrogenase" 1966 Cryobiology, 2(6):335-41.

Habermann, "Increased serum levels of complement C3a anaphylatoxin indicate the presence of colorectal tumors" 2006 Gastroenterology, 131(4):1020-9; quiz 1284.

Hancock, "Molecular Mobility of Amorphous Pharmaceutical Solids Below Their Glass Transition Temperatures" Jun. 1995 Pharmacological Research, 12(1995):799-806.

Hatley, "The Cold-Induced Denaturation of Lactate-Dehydrogenase at Sub-Zero Temperatures in the Absence of Perturbants" 1989 Febs Letters, 257(1): 171-173.

(56) References Cited

OTHER PUBLICATIONS

Hsieh, "Systematical evaluation of the effects of sample collection procedures on low-molecular-weight serum/plasma proteome profiling" May 2006 *Proteomics*, 6(10):3189-98.
Ikeda, "Evaluation of the short-term stability of specimens for clinical laboratory testing" 2015 *Biopreserv Biobank*, 13(2):135-43.
Imamura, "Water sorption and glass transition behaviors of freeze-dried sucrosedextran mixtures" 2002 *Pharmaceutical Research*, 2175-2181.
Insenser, "Impact of the storage temperature on human plasma proteomic analysis: Implications for the use of human plasma collections in research" 2010 *Proteomics Clin. Appl* (2010) 739-744.
Iqbal, "Pyruvate kinase M2 and cancer: an updated assessment" 2014 *FEBS Lett*, 588(16):2685-92.
Jones, "Dehydration of trehalose dihydrate at low relative humidity and ambient temperature" 2006 *International journal of pharmaceutics* (2006):87-98.
Kamlage, "Quality markers addressing preanalytical variations of blood and plasma processing identified by broad and targeted metabolite profiling" 2014 *Clin Chem*, 60(2):399-412.
Kerwin, "Polysorbates 20 and 80 used in the formulation of protein biotherapeutics: structure and degradation pathways" 2008 *J Pharm Sci*, 97(8):2924-35.
Kisand, "Impact of cryopreservation on serum concentration of matrix metalloproteinases (MMP)-7, TIMP-1, vascular growth factors (VEGF) and VEGF-R2 in Biobank samples" 2011 *Clin Chem Lab Med*, 49(2):229-35.
Kubrak, "Comparative characteristics of lactate dehydrogenase from the liver and white muscles of common carp (*Cyprinus carpio*)" 2008 *Ukr Biokhim Zh* 80(4):35-41. Abstract only/.
Lee, "Proteomic analysis of the effect of storage temperature on human serum" 2010 *Ann Clin Lab Sci*, 40(1):61-70.
Lengelle, "Soluble CD40 ligand as a biomarker for storage-related preanalytic variations of human serum" 2008 *Cytokine*, 44(2):275-82.
Less, "Isothermal vitrification methodology development for non-cryogenic storage of archival human sera" Jan. 2013 *Cryobio.*, 66(2):176-185.
Lopez, "Mechanistic elements of protein cold denaturation" 2008 *Journal of Physical Chemistry B*, 112(19):5961-5967.
Ludwig, "Biomarkers in cancer staging, prognosis and treatment selection" 2005 *Nat Rev Cancer*, 5(11):845-56.
Magazu, "Dynamics of glass-forming bioprotectant systems" Jan. 2011 *Journal of Non-Crystalline Solids*, 691-694.
Malsam, "Hydrogen Bonding Kinetics of Water in High Concentration Trehalose Solutions at Cryogenic Temperatures" 2009 *Journal of Physical Chemistry B* 113:6792-6799.
Manning, "Stability of protein pharmaceuticals: an update" 2010 *Pharm Res*, 27(4):544-75.
Markert, "Lactate dehydrogenase isozymes: dissociation and denaturation by dilution" Jun. 1968 *Science*, 162(3854):695-7.
Mcdade, "High-sensitivity enzyme immunoassay for C-reactive protein in dried blood spots" Mar. 2004 *Clin Chem*, 50(3):652-4.
Mi, "Cryoprotection mechanisms of polyethylene glycols on lactate dehydrogenase during freeze-thawing" Sep. 2004 *AAPS J*, 6(3):e22.
Mi, "Effects of polyethylene glycol molecular weight and concentration on lactate dehydrogenase activity in solution and after freeze-thawing" May-Jun. 2002 *PDA J Pharm Sci Technol*, 56(3):115-23.
Mi, "The application and mechanisms of polyethylene glycol 8000 on stabilizing lactate dehydrogenase during lyophilization" 2004 *PDA J Pharm Sci Technol*, 58(4):192-202.
Miller, "Thermophysical Properties of Trehalose and Its Concentrated Aqueous Solutions" 1997 *Pharmaceutical Research*, 14(5):578-590.
Nagrath, "Isolation of rare circulating tumour cells in cancer patients by microchip technology" Dec. 2007 *Nature*, 450(7173):1235-9.

Nema, "Freeze-thaw studies of a model protein, lactate dehydrogenase, in the presence of cryoprotectants" 1993 *J Parenter Sci Technol*, 47(2):76-83.
Oragene Dx (OGD-500), DNA Genotek. Online: http://www.dnagenotek.com/US/products/OGD500.html.
Panesar, "Stability of serum thyroid hormones following 8-11 years of cold storage" 2010 *Clin Chem Lab Med*, 48(3):409-12.
Parker, "Mass spectrometry based biomarker discovery, verification, and validation—Quality assurance and control of protein biomarker assays" 2014 *Molecular Oncology*, 8(4):840-858.
Pikal-Cleland, "Protein denaturation during freezing and thawing in phosphate buffer systems: monomeric and tetrameric beta-galactosidase" 2000 *Arch Biochem Biophys*, 384(2):398-406.
Poste, "Bring on the biomarkers" Jan. 2011 *Nature*, 469(7329):156-7.
PrimeStore-MTM, Longhorn Vaccines and Diagnostics, LLC. Online: https://www.lhnvd.com/primestore-mtm.
Privalov, "Cold Denaturation of Proteins" 1990 *Critical Reviews in Biochemistry and Molecular Biology*, 25(4):281-305.
Qiagen, "Gentra® Puregene® Handbook" Dec. 2014, 72 pages.
Ragoonanan, "Heterogeneity in Desiccated Solutions: Implications for Biostabilization" 2008 *Biophysical Journal*, 94(6):2212-2227.
Ragoonanan, "Protein stabilization" 2007 *Transfusion Medicine and Hemotherapy*, 34(4):246-252.
Rawat, "Molecular mechanism of polyethylene glycol mediated stabilization of protein" Feb. 2010 *Biochem Biophys Res Commun*, 392(4):561-6.
Reinhart, "Influence of polyethylene glycols on the kinetics of rat liver phosphofructokinase" Nov. 1980 *J Biol Chem*, 255(22):10576-8.
Rhea, "Cancer biomarkers: surviving the journey from bench to bedside" 2011 *MLO Med Lab Obs*, 43(3):10-2, 16, 18; quiz 20, 22.
Ridker, "C-reactive protein and other markers of inflammation in the prediction of cardiovascular disease in women" Mar. 2000 *New England Journal of Medicine*, 342(12):836-843.
Rifai, "Protein biomarker discovery and validation: the long and uncertain path to clinical utility" Aug. 2006 *Nature Biotechnology*, 24(8):971-983.
Rouy, "Plasma storage at -80 degrees C does not protect matrix metalloproteinase-9 from degradation" Mar. 2005 *Anal Biochem*, 338(2):294-8.
Roy, "Matrix metalloproteinases as novel biomarkers and potential therapeutic targets in human cancer" 2009 *J Clin Oncol*, 27(31):5287-97.
Schrohl, "Banking of biological fluids for studies of disease-associated protein biomarkers" Oct. 2008 *Mol Cell Proteomics*, 7(10):2061-6.
Schwegman, "Evidence of Partial Unfolding of Proteins at the Ice/Freeze-Concentrate Interface by Infrared Microscopy" 2009 *Journal of Pharmaceutical Sciences*, 98(9):3239-3246.
Siegel, "Cancer Statistics, 2015" 2015 *Ca-a Cancer Journal for Clinicians*, 65(1):5-29.
Soliman, "Factors Affecting Freezing Damage of Lactic Dehydrogenase" Feb. 1971 *Cryobiology*, 8(1):73-78.
Solivio, "Adsorbing/dissolving Lyoprotectant Matrix Technology for Non-cryogenic Storage of Archival Human Sera" Apr. 2016.
Starnes, "Effect of storage conditions on lactate dehydrogenase released from perfused hearts" 2008 *International Journal of Cardiology*, 127(1): 114-116.
Starnes, "Effects of storage time and freezing on the activity of lactate dehydrogenase released from rat hearts" 2006 *Faseb Journal*, 20(5):A1153-A1153.
Strambini, "Protein Stability in Ice" Mar. 2007 *Biophysical Journal*, 92:2131-2138.
Sundaramurthi, "Trehalose Crystallization During Freeze-Drying: Implications on Lyoprotection" 2009 *The Journal of Physical Chemistry Letters*, 1(2): 510-514.
Tamiya, "Freeze denaturation of enzymes and its prevention with additives" Oct. 1985 *Cryobiology*, 22(5):446-56.
Timasheff, "Protein Hydration, Thermodynamic Binding, and Preferential Hydration" Nov. 2002 *Biochemistry*, 41(46):13473-13482.
Twomey, "In Situ Spectroscopic Quantification of Protein-Ice Interactions" 2013 *Journal of Physical Chemistry B*, 117:7889-7897.

(56) References Cited

OTHER PUBLICATIONS

Vagenende, "Mechanisms of protein stabilization and prevention of protein aggregation by glycerol" Nov. 2009 *Biochemistry*, 48(46):11084-96.

Vaught, "Biobankonomics: developing a sustainable business model approach for the formation of a human tissue biobank" 2011 *Journal of the National Cancer Institute Monographs*, 2011 (42): 24-31.

Whatman® FTA® cards. Online: https://www.sigmaaldrich.com/catalog/product/sigma/z719730?lang=en&region=US.

Woodrum, "Stability of free prostate-specific antigen in serum samples under a variety of sample collection and sample storage conditions" 1996 *Urology*, 48(6A Suppl):33-9.

Yamamoto, "Dissociation-association of lactate dehydrogenase isozymes: influences on the formation of tetramers versus dimers of M4-LDH and H4-LDH" 1988 *Int J Biochem*, 20(11):1261-5.

Yang, "Effect of blood sampling, processing, and storage on the measurement of complement activation biomarkers" 2015 *Am J Clin Pathol*, 2015. 143(4):558-65.

\* cited by examiner

COMPOSITIONS AND METHOD FOR STORING LIQUID BIOSPECIMENS

CROSS-REFERENCE TO RELATED APPLICATION

This application claims priority to U.S. Provisional Patent Application No. 62/254,297, filed Nov. 12, 2015, which is incorporated herein by reference.

GOVERNMENT FUNDING

This invention was made with government support under CA157298 awarded by the National Institutes of Health and CBET-1335936 and CBET-0644784 awarded by the National Science Foundation. The government has certain rights in the invention.

SUMMARY

This disclosure describes, in one aspect, a lyoprotectant matrix. Generally, the lyoprotectant matrix includes a nonwoven web having fibers having an average diameter of 0.1 µm to 10 µm and having, as components, at least one lyoprotective carbohydrate and at least one polymer. The matrix further possesses an apparent pore size of 0.1 µm to 500 µm.

In some embodiments, the lyoprotective carbohydrate can include a monosaccharide or a disaccharide such as, for example, trehalose.

In some embodiments, the polymer can include dextran, PVP, or PVA.

In some embodiments, the fibers can further include at least one excipient such as, for example, an amino acid, an antioxidant, a polymer, a carbohydrate, or a bulking agent. In some of the embodiments, the excipient can include glycerol, polyethylene glycol (PEG), Tween 20, gluconic acid, or glucamine. In one particular embodiment, the fibers can include glycerol, polyethylene glycol (PEG), Tween 20, gluconic acid, and glucamine.

In another aspect, this disclosure describes a composition that includes a liquid biospecimen and at least a portion of any embodiments of the lyoprotectant matrix summarized above dissolved within the liquid biospecimen.

In another aspect, this disclosure describes a method for storing a liquid biospecimen. Generally the method includes providing any embodiment of the lyoprotectant matrix summarized above, introducing at least a portion of a liquid biospecimen to the lyoprotectant matrix, drying the specimen-loaded matrix, and storing the dried specimen-loaded matrix.

In some embodiments, the liquid biospecimen can include whole blood, serum, saliva, or urine.

In some embodiments, drying the specimen-loaded matrix can involve air-drying. In other embodiments, drying the specimen-loaded matrix can involve vacuum drying.

In some embodiments, the dried specimen-loaded matrix can be stored at a temperature of no less than 4° C. In some of these embodiments, the dried specimen-loaded can be stored at a temperature of no less than 22° C.

In some embodiments, the dried specimen-loaded matrix can be stored for at least two years. In some of these embodiments, the dried specimen-loaded matrix can be stored for at least 12 years.

In some embodiments, the method can further include rehydrating the dried specimen-loaded matrix. In some of these embodiments, the method can further include analyzing the rehydrated specimen for the presence and/or activity of at least one biomarker of interest.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

CRP and PSA show complete recovery following desiccation while MMP-7 and C3a have a recovery of >90%.

Figure 6:
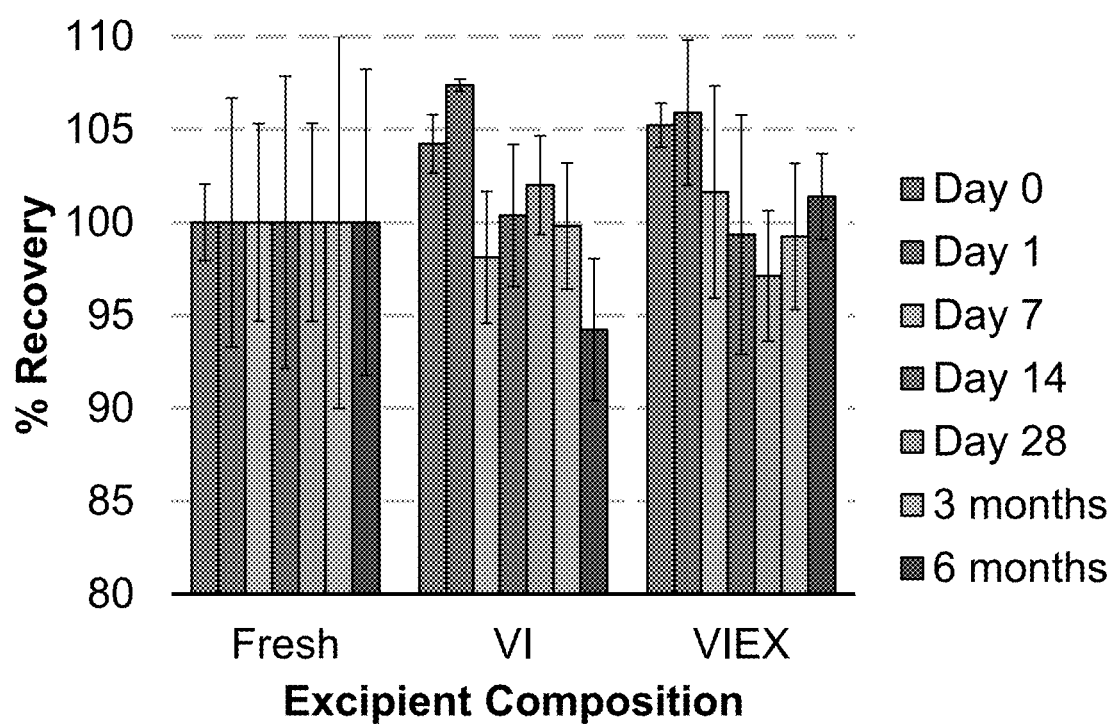

FIG. 6. Plot showing the storage stability of LDH spiked into human serum, preserved and stored with the lyoprotectant matrix for up to 6 months at room temperature. VI: the basic matrix that contains only the high concentration excipients; VIEX: the lyoprotectant matrix that contains the high concentration and the low concentration excipients FIG. 7. Activity of LDH measured in human serum, dried overnight using different amounts of lyoprotectant material. VI: the basic matrix that contains only the high concentration excipients; VIEX: the lyoprotectant matrix that contains the high concentration and the low concentration excipients FIG. 8. Activity of CRP measured in human serum, dried overnight using different lyoprotectant matrices. VI: the basic matrix that contains only the high concentration excipients; VIEX: the lyoprotectant matrix that contains the high concentration and the low concentration excipients

DETAILED DESCRIPTION OF ILLUSTRATIVE EMBODIMENTS

This disclosure described storage compositions for storing biospecimens. The discovery and validation of molecular biomarkers (disease signatures) can allow early disease detection, the ability to monitor the progression of disease, and/or monitor therapeutic response. Identifying sensitive (correctly identifies patients with disease) and specific (correctly eliminates patients without disease) biomarkers and/or biomarker arrays can, for example, reduce mortality, improve quality of life, and/or reduce healthcare costs. Even with advances in instrumentation and analytical techniques, and with thousands of research articles offering thousands of molecular signatures as potential biomarkers, very few of these biomarkers are approved by the FDA. Some reasons for slow progress are the poor stability of many biomarker biomolecules in the collected human specimens (tissue samples, bodily fluids, etc.) and the sub-optimal storage conditions that result in modifications to the samples, which can significantly impede the process of biomarker discovery and clinical implementation.

Molecular biomarkers such as, for example, proteins, enzymes, metabolites, lipids, cell-free RNA, and/or cell-free DNA can be found in a variety of bodily fluids, tissues, and cells. Blood is an attractive source of molecular information as it circulates and, therefore, samples the whole body. Moreover, blood can be collected in relatively large volumes frequently and easily with minimal risk. For example, blood and serum are easily and relatively painlessly collected compared to body fluids like cerebrospinal fluid and synovial fluid, each of which is collected by methods that are painful and pose risk to the patient. The use of blood and serum for molecular information is also facilitated by the availability of numerous medical laboratory facilities for analysis and the substantial information available on the typical values of many blood and serum components.

While described in detail below in the context of protein biomarkers, the compositions and methods described herein can be used to store a sample and later analyze the sample for any biomarker suitable for the condition under study, analysis, and/or investigation. Thus, the compositions and methods described herein can be used to store a sample so that one or more proteins, enzymes, metabolites, lipids, cell-free RNA, cell-free DNA, and/or any combination of biomarkers for later analysis. The use of protein biomarkers as model biomarkers in this disclosure reflects the observation that protein biomarkers are frequently affected by disease, therapeutic response, and/or recovery.

The biomarker pipeline includes a series of phases including, discovery, verification, and clinical validation, each of which calls for the availability of high quality samples. To qualify for clinical approval, a potential biomarker needs to be verified and validated using hundreds of specimens and should exhibit reproducibility, specificity, and sensitivity. Liquid biospecimens are archived in biorepositories, representing a plethora of potential information about initiation and progression of diseases. One challenge for exploring these samples is the availability of advanced and sensitive detection tools to extract information from stored biospecimens. Another challenge is the availability of biospecimens where the molecular information content of the samples is conserved. Even when best practices are followed and samples are frozen immediately after being collected and processed, freeze-thaw cycles can compromise sample integrity by introducing stresses that result in modifications to biomarkers including, for example, protein unfolding and/or aggregation, which can irreversibly alter characteristics of the biomarker such as, for example, structure and/or activity.

Much of the damage incurred during cooling, freezing, and cryogenic storage is due to one or more of the following factors. One factor is temperature. The native structure of some proteins can be destabilized at low temperatures, thermodynamically favoring the unfolded state (i.e., cold denaturation). A second factor is osmotic/dehydration stress. Low water chemical activity in the freeze-concentrate decreases the free energy of the denatured state, making it thermodynamically preferred. A third factor is pH shift. Cooling and freezing can induce changes in ionic solubility—as much as a 40-fold concentration increase—and pH, which can destabilize and denature proteins. Slow freezing and thawing can incur more damage due to these factors as proteins are exposed to high solute concentrations and extreme pH for a longer period than fast freezing and thawing. A fourth factor is protein and solute aggregation. Freeze concentration can promote crowding, hydrophobic interactions, and/or changes in free energy, which can result in protein aggregation. A fifth factor is protein-gas interactions. Gas bubbles are generated during cooling due to the diminished gas solubility at low temperatures. Exposure of proteins to the gas-liquid interface can promote denaturation and/or aggregation. A sixth factor is protein-ice interactions. Many proteins are adsorbed onto the ice surface, where they can aggregate and denature. Additionally, ice growth and/or re-crystallization during freezing expose proteins to mechanical compression stresses, which results to unfolding and aggregation. While slow freezing and thawing rates can damage proteins due to prolonged exposure, rapid freezing also can be detrimental as it is associated with a high degree of supercooling, which generates a large number of ice crystals and, consequently, a larger surface area available for interaction with proteins.

Cryogenic storage can impart modifications on proteinaceous biomarkers. The modifications can include, for example, spontaneous unfolding of the protein (e.g., cold denaturation), ice-induced unfolding and/or aggregation, degradation, and/or dissociation, each of which can influence protein recovery and/or biological activity and, consequently, the accuracy of findings on biomarker-related investigations. Many promising protein cancer biomarkers can be susceptible to freeze/thaw and frozen state storage. Lactate dehydrogenase (LDH) is a biomarker currently being evaluated for various types of cancer including, for example, renal cancer and melanoma. LDH has been extensively studied and frequently used as a model for protein stabilization research because of its known fragility to storage processes, especially cryogenic storage and freeze-thaw, manifested as change in enzymatic activity often attributable to either association or dissociation of the enzyme's multimer. C3a, a known breast cancer biomarker also is particularly sensitive to storage conditions. Additional biomarkers include Metalloproteinase-9 (MMP-9), which can degrade at −80° C., dropping by 65% in activity within two years of storage. In fact, the MMP family (MMP-1, MMP-7, MMP-9, MMP-13) and the related ADAMS family, which are identified as diagnostic and prognostic biomarkers in cancers such as breast, pancreas, lung, bladder, colorectal, ovarian, prostate, and brain can be susceptible to modifications caused by freezing and thawing.

In addition to the detrimental effects imposed by cryogenic storage on numerous proteinaceous biomarkers, frozen state storage and transport of biospecimens can be costly, requiring large, dedicated, well-controlled, and equipped spaces with very large carbon footprint. For example, storing more than 600 million biospecimens can involve at least 30,000 mechanical freezers purchased at a market value of over $600 million, running an electricity bill of around $55 million/year. Added to these numbers are the costs associated with the housing, maintaining, and staffing the biorepositories and the installation of backup generators, safety and security systems, and cataloging/database software. Room temperature storage can provide a less costly alternative for short-term and long-term storing liquid biospecimens in biorepositories.

Commercially available dry state storage technologies are generally used for genetic (e.g., DNA and RNA) biomarker stabilization through the use of a solid insoluble support matrix, chemical stabilizers and air-drying. However, there is currently no technology available for stabilizing a large spectrum of biomarkers at a dried state.

This disclosure presents a stabilization material and methodology to enable storing liquid biospecimens (e.g., blood or serum) at room temperature using isothermal vitrification technology. The biopreservation material, an electrospun adsorbing/dissolving matrix, can be made from a lyoprotectant cocktail that includes components that stabilize biomarkers in the liquid biospecimen during isothermal vitrification and room temperature storage. This novel matrix rapidly adsorbs the liquid biospecimen while dissolving in it. The matrix saturated with the liquid biospecimen is then rapidly desiccated to produce a very viscous fluid. In the viscous, glassy state, the biomarkers in the biospecimen are stabilized and can be stored long term, providing an alternative to frozen state storage for fluid biospecimens. When rehydrated after storage, the matrix allows for total protein recovery and storage of liquid biospecimens at room temperature. This newly developed isothermal vitrification technology provides an excellent alternative to frozen state storage for fluid biospecimens.

High concentrations of carbohydrate lyoprotectants can stabilize biological specimens by vitrification. It can be difficult, however, to uniformly mix carbohydrate lyoprotectants at high concentration (e.g., 1M-2M) with liquid biospecimens of high protein content (e.g., serum) as the sugars tend to form undissolved aggregates. Creating a uniform mix of carbohydrate lyoprotectants typically requires rigorous mixing of the solution, which can be detrimental to maintaining the structure and/or functionality of biomarkers (e.g., serum proteins) in a liquid biospecimen. Non-uniform mixing of sugars and/or heterogeneity introduced during drying can degrade biospecimen components during dried/vitrified state biopreservation. The adsorbent/dissolving matrix technology described herein is designed to avoid these problems while enabling manufacturing scalability.

Isothermal vitrification using the adsorbent/dissolving matrix technology is described in detail as follows in the context of an exemplary embodiment in which the liquid biospecimen is serum and the biomarker is a protein. As will be described in greater detail later, this is a model, exemplary embodiment. Variations in the adsorbent/dissolving matrix and variations in the methods of preparing and using the matrix are possible and addressed below.

Figure 1:
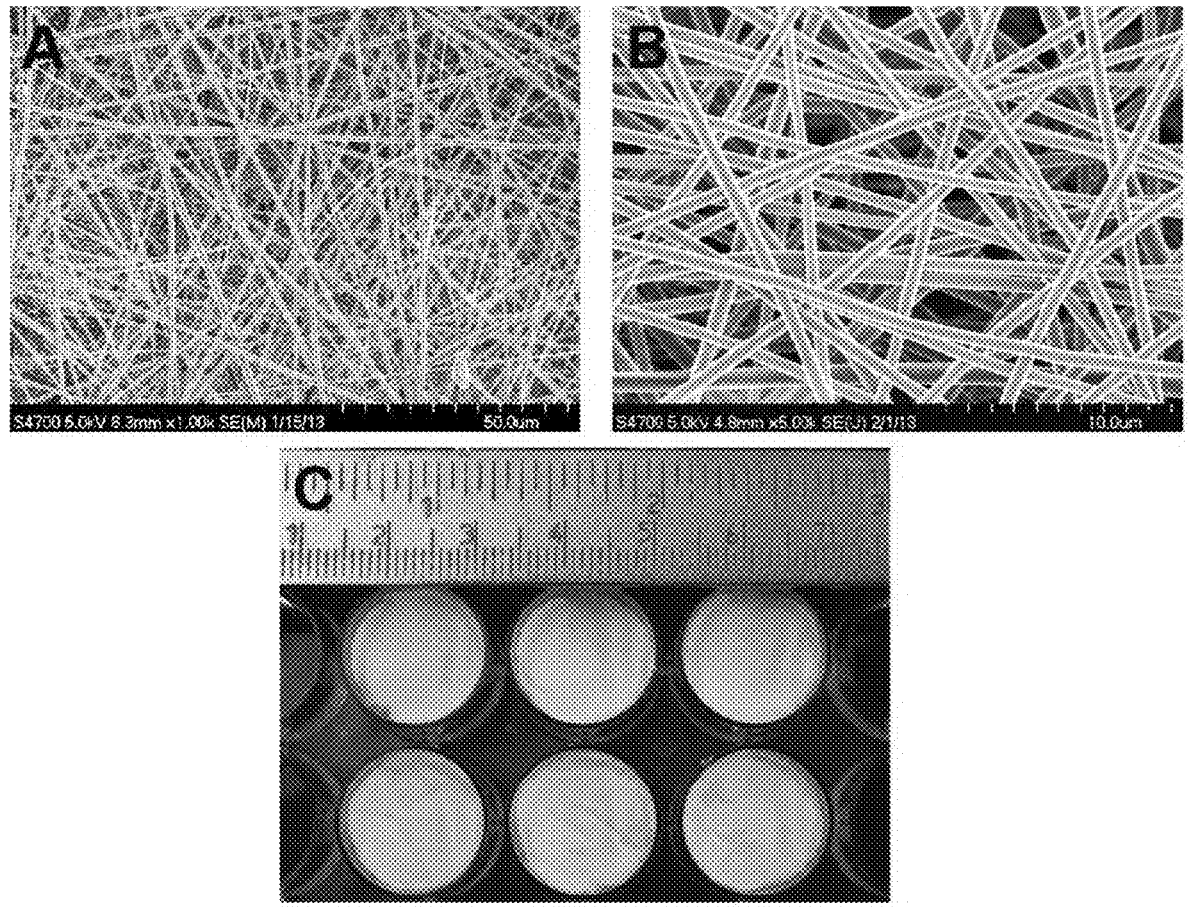
FIG. 1. (A) Low magnification and (B) High magnification SEM images of the electrospun adsorbing/dissolving matrix. (C) The matrix packaged in a 24-well plate, ready for use.

An archival liquid biospecimen, a serum sample, is transferred to 24-well plates (150 serum/well), in which at least some of the wells are pre-packed with adsorbent matrix in the well (FIG. 1C). In commercial use, it is anticipated that the material may be packed into a plurality of wells of a conventional multi-well plate. The multi-well plate may have any desirable number of wells—e.g., a 6-well plate, a 12-well plate, a 24-well plate, a 48-well plate, a 60-well plate, a 72-well plate, a 96-well plate, a 384-well plate, or a 1536-well plate. In typical commercial embodiments, all or most of the wells may be packed with matrix, but it is also possible that only a subset may be packed with the matrix so that other wells are empty or, in some cases, prepared for performing other methods, thereby including multiple biochemical functionalities in a single multi-well plate.

Each well can include, independent of the amount of absorbent/dissolving matrix provided in any other well, any suitable amount of the matrix for a given application. A well can include, for example, a minimum of at least 10 mg of absorbent/dissolving matrix material, such as, for example, at least 25 mg, at least 50 mg, at least 100 mg, at least 150 mg, at least 200 mg, or at least 250 mg of the matrix material. A well can include a maximum amount of matrix material that is no more than 2 g of matrix material such as, for example, no more than 1 g, no more than 500 mg, no more than 250 mg, no more than 200 mg, no more than 150 mg, no more than 100 mg, or no more than 50 mg of matrix material. The amount of matrix material in a well also can be defined by a range having as endpoints any minimum amount of matrix material listed above and any maximum amount of matrix material listed above that is greater than the selected minimum amount of matrix material.

Capillary forces induced by the porous nature of the lyoprotectant matrix cause the serum biospecimen to be uniformly adsorbed while the matrix slowly dissolves and thoroughly mixes with serum. The mixture produced is substantially uniform, with minimal or no clumping of the carbohydrate lyoprotectant, formation of a skin, etc.

To produce one embodiment of the lyoprotectant matrix, a high voltage differential was used to extrude the viscous lyoprotectant cocktail to form fibers of 0.4-0.5 μm in diameter (FIGS. 1(A) and (B)). Multiple layers of fibers were woven together and dried to produce a very adsorbent and porous matrix (the sponge) (FIG. 1C).

Figure 2:
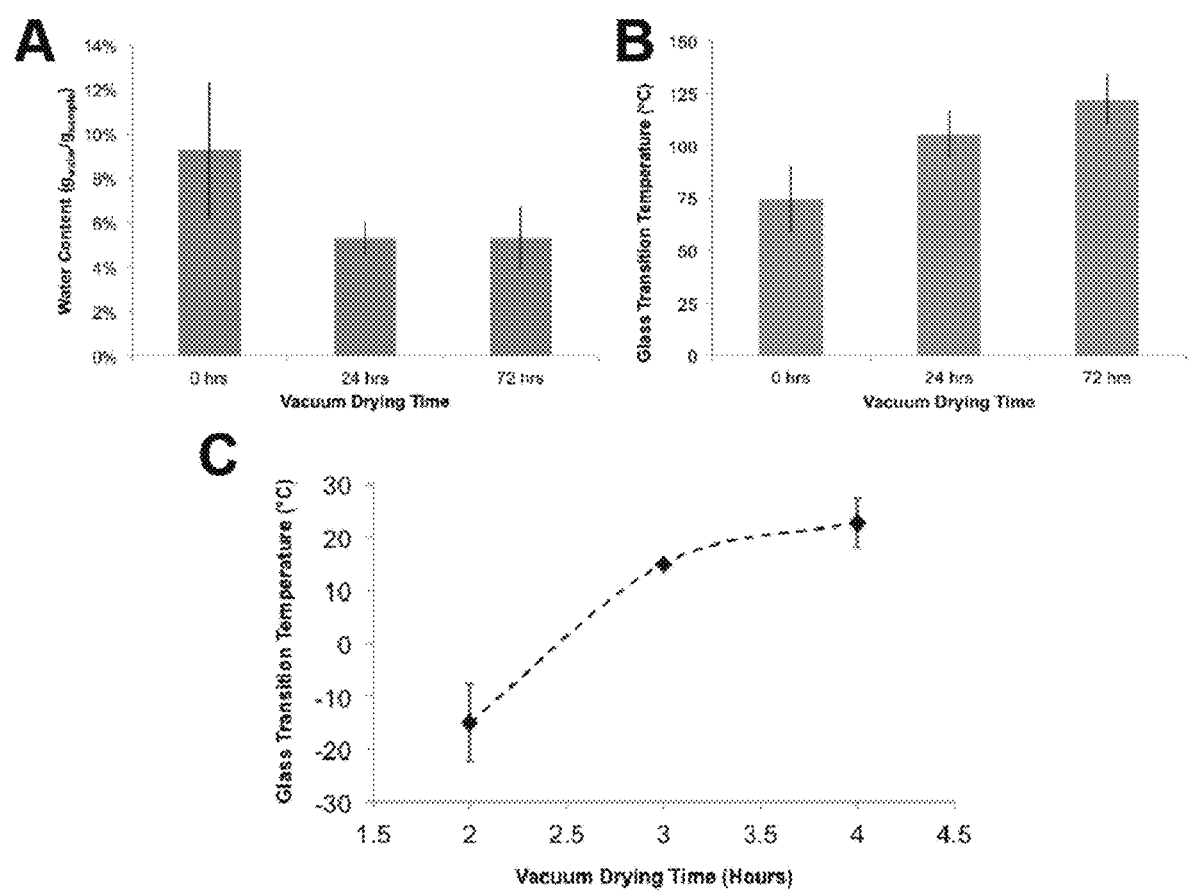
FIG. 2. (A) Change in the water content of the electrospun matrix with vacuum drying, before use. (B) The corresponding change in the glass transition temperature of the electrospun matrix with vacuum drying. (C) Glass transition temperature of the desiccated human serum adsorbed into the matrix and vacuum dried.

Electrospun matrices were compacted in 24-well plates (250±5 mg/well) and vacuum dried for 24 hours to reduce the water content of the matrix, which aided in increasing the glass transition temperature of the serum sample after mixing. Before vacuum drying, the water content (w/w) of the matrix was 9.69%±0.65 (n=3), which decreased to 5.59%±0.43 (n=3) after 24 hours of drying. Water content of the matrix was measured by baking it at 130° C. for 60 minutes and recording the change in its weight. Drying the matrix beyond 24 hours did not significantly alter its water content (FIG. 2A) while increasing its glass transition temperature slightly (FIG. 2B). Trehalose is a fragile glass former; thus, even minute changes in water content may cause significant changes in the glass transition temperature, particularly at very low water content.

The serum samples (or, in some experiments, a model serum solution) were then transferred to in 24-well plates (150 μL serum/well), which contained approximately 250 mg of the adsorbent matrix/well (FIG. 1C). The specimen was then vacuum dried for four hours. At the end of the four-hour drying period the sample was ready for storage in a standard refrigerator (4° C.) as its glass transition temperature was already >4° C. (FIG. 2C). At 4° C., therefore, the biospecimen is a glass, all biochemical reactions and degradation are stopped. For enhanced stability, the 24-well plate that contained the isothermally vitrified sera was stored in the dark in a dry environment. At the end of the storage period, the desiccated sample was re-hydrated by adding ultrapure water (ten times the original volume, taking into account the volume lost during drying) and analytical testing was conducted as described below.

At the early stages of isothermal vitrification matrix development, a significant number of short and medium term stability experiments were conducted with human serum isolated from whole blood (as described in the Examples, below) to determine the stability (aggregation and degradation) of selected high abundance proteins (HAP), albumin and haptaglobulin. The details of the experiments conducted and the results are presented in detail in Table 3. In these experiments, the changes in HAP signatures in sera samples isothermally vitrified using different versions of the lyoprotectant matrix (V1, V2, and V3) was compared to those from frozen samples stored at −20° C., −40° C. or −80° C., and also to those exposed to repeated freeze/thaw. Repetitive freezing and thawing was induced by immersing the sample in liquid nitrogen, followed by immersion in a room temperature water bath and repeating the process. Matrix V1 contained only trehalose and dextran; matrix V2 included trehalose, dextran, and 0.5% Tween 20; and matrix V3 included trehalose, dextran, 0.5% Tween 20, and 3% glycerol.

Figure 3:
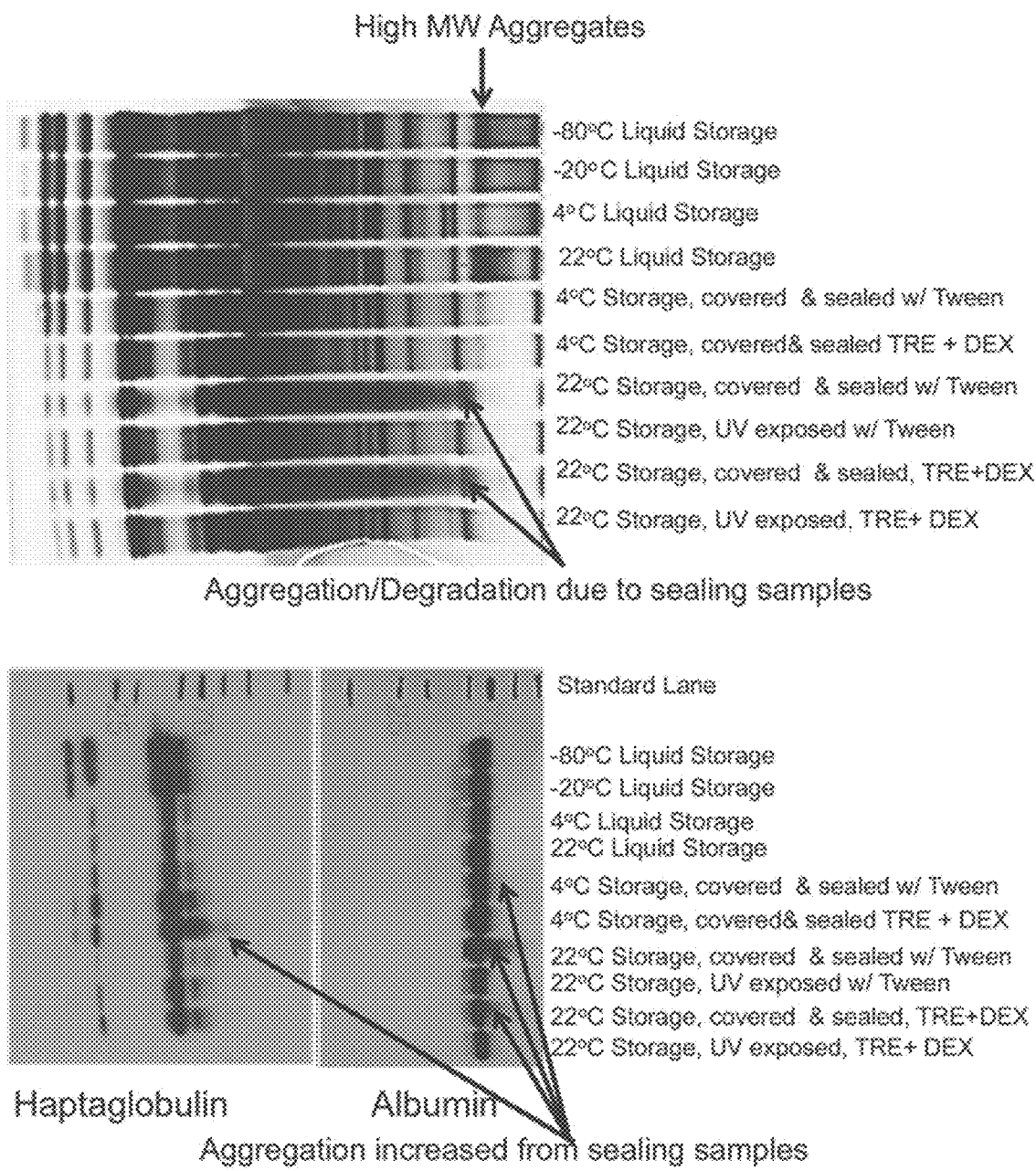
FIG. 3. Sample experimental result using human serum sample isothermally vitrified and stored for two weeks at 4° C. vs. 22° C. in sealed (constant relative humidity) vs. unsealed (variable relative humidity). The silver stain and Western blot analyses for albumin and haptoglobin are included to quantify aggregation/degradation behaviors of total serum proteins and high abundance proteins (HAPs). The results were compared to storage at −80° C., −20° C., 4° C., and 22° C. without using any cryoprotectant agent.

For the purpose of avoiding HAP aggregation during desiccation, Tween 20 and glycerol had minimum effect but it was noted that the aggregation observed following desiccation and rehydration of HAPs were not inferior to that observed after freeze/thaw. A sample result obtained from the experiments outlined in Table 3 is presented in FIG. 3. In that particular experiment, samples were stored at 4° C. or 22° C. storage, in either sealed containers with controlled humidity or in unsealed containers, for two weeks. Isothermal vitrification was compared to frozen state storage at −20° C. and −80° C. The analysis included SDS-PAGE electrophoresis with silver staining for total serum protein and Western blot experiments for albumin and haptaglobulin. FIG. 3 (left panel) shows a sample silver stained gel profile for serum samples stored at −80° C., −20° C., 4° C. and 22° C. (lanes 1-4 from the left) and isothermally vitrified samples stored at various conditions (lanes 5-10). High molecular weight aggregates in liquid storage (un-desiccated) samples are more pronounced in samples kept at room temperature (22° C.), followed by samples stored at −80° C. and −20° C. and are at the lowest level for samples stored at 4° C. These aggregates were also observed at very low levels in isothermally vitrified samples stored at 4° C. that were covered and sealed, with and without Tween 20 (lanes 5-6). Samples that were covered and sealed with and without Tween 20 that were stored in 22° C. showed both aggregation and degradation (lanes 7 and 9), which were not present in unsealed samples (lanes 8 and 10). UV exposure of desiccated samples did not result to increased aggregation or degradation. In a separate experiment, unsealed, isothermally vitrified samples, with and without Tween 20 stored at 22° C. produced a different profile, with no high molecular weight aggregates that were observed in samples kept in various liquid storage conditions (data not shown), which indicated that desiccated storage in unsealed containers does not promote as much aggregation as liquid storage. Sealing during desiccation caused proteins to aggregate, which was exacerbated by the presence of Tween 20. The presence of Tween 20 alone in the matrix did not cause proteins to aggregate.

FIG. 3 (right panels) show typical Western Blot analyses conducted on HAPs following storage. No albumin aggregation was observed in samples stored in a liquid state (lanes 1-4), indicating that the high molecular weight bands observed in the silver stained gels were not due to albumin aggregation, while albumin aggregation likely contributed to those observed in sealed isothermally vitrified samples. The observations for silver staining of total serum protein coincided well with Western Blot results for albumin in desiccated samples. The highest level of albumin aggregation was observed for sealed samples containing Tween 20, stored at 22° C. Almost undetectable level of aggregation was observed for covered and sealed samples containing Tween 20 that were kept at 4° C., which was absent in samples without the surfactant. The presence of Tween 20 alone, however, did not result in any detectable modification, while sealing alone resulted to aggregation. These observations indicated that sealing promotes albumin aggregation, which is intensified by the presence of Tween 20. Haptaglobulin showed a similar profile throughout all samples, except for the sample containing Tween 20, which was sealed and stored at 22° C. Unsealed desiccated samples stored at 4° C. and 22° C., with or without Tween 20 showed minimal aggregation or degradation as compared to samples in cryogenic storage. These results demonstrate the feasibility of using isothermal vitrification as an alternative to cryogenic storage for stabilizing serum proteins.

Collectively, the experimental set forth above were used to finalize the composition of an exemplary lyoprotectant cocktail for producing an exemplary electrospun isothermal vitrification matrix that is designed for stabilizing low abundance proteins (LAP), specifically those that may be used as cancer biomarkers.

Many clinically relevant biomarkers are present in a liquid biospecimen at low abundance compared to, for example, the amount of high abundance proteins such as albumin and haptaglobulin. Thus, the desiccation resistance of low abundance markers using the lyoprotectant matrix was evaluated. These experiments used a model serum solution (1×PBS containing 50 g/L albumin) to simplify processing and increase the output of the experiments. Post-desiccation recovery of five selected proteinaceous cancer biomarkers as determined by enzyme activity assay or ELISA following desiccation/rehydration was used to evaluate various the low-concentration excipients that may be included in the matrix in addition to the main lyoprotectant components, trehalose and dextran. The biomarkers that were selected for this purpose were; lactate dehydrogenase (LDH) (freeze-thaw unstable), C-reactive protein (freeze, freeze-thaw, room temperature and refrigeration: 4° C. stable), total prostate-specific antigen (total PSA) (freeze, freeze-thaw and refrigeration: 4° C. stable), matrix metalloproteinase-7 (MMP-7) (freeze stable, freeze-thaw unstable), and C3a (freeze stable, freeze-thaw and refrigeration: 4° C. unstable), representing various storage sensitivities to tailor the matrix for the preservation of an expanded number of protein biomarkers. The concentrations of the biomarkers spiked into the model serum solution were: 8 µg/mL LDH, a concentration determined to be the most vulnerable to repeated freezing and thawing allowing us to monitor changes in activity during processing, 4.0 ng/mL PSA, 1 µg/mL C-reactive protein, 11.5 ng/mL MMP-7, and 11 µg/mL C3a, which are the lower threshold serum concentrations for these biomarkers.

LDH was selected as a model biomarker because of its high sensitivity to sample processing like freezing and thawing, its multimeric nature (which represented highly sensitive multimeric proteins as targets for stabilization), and the commercial availability of the enzymatic assay to monitor any structural perturbation as this is reflected as a change in enzymatic activity. All experimental values were normalized relative to the fresh serum model control set at 100%.

Figure 4:
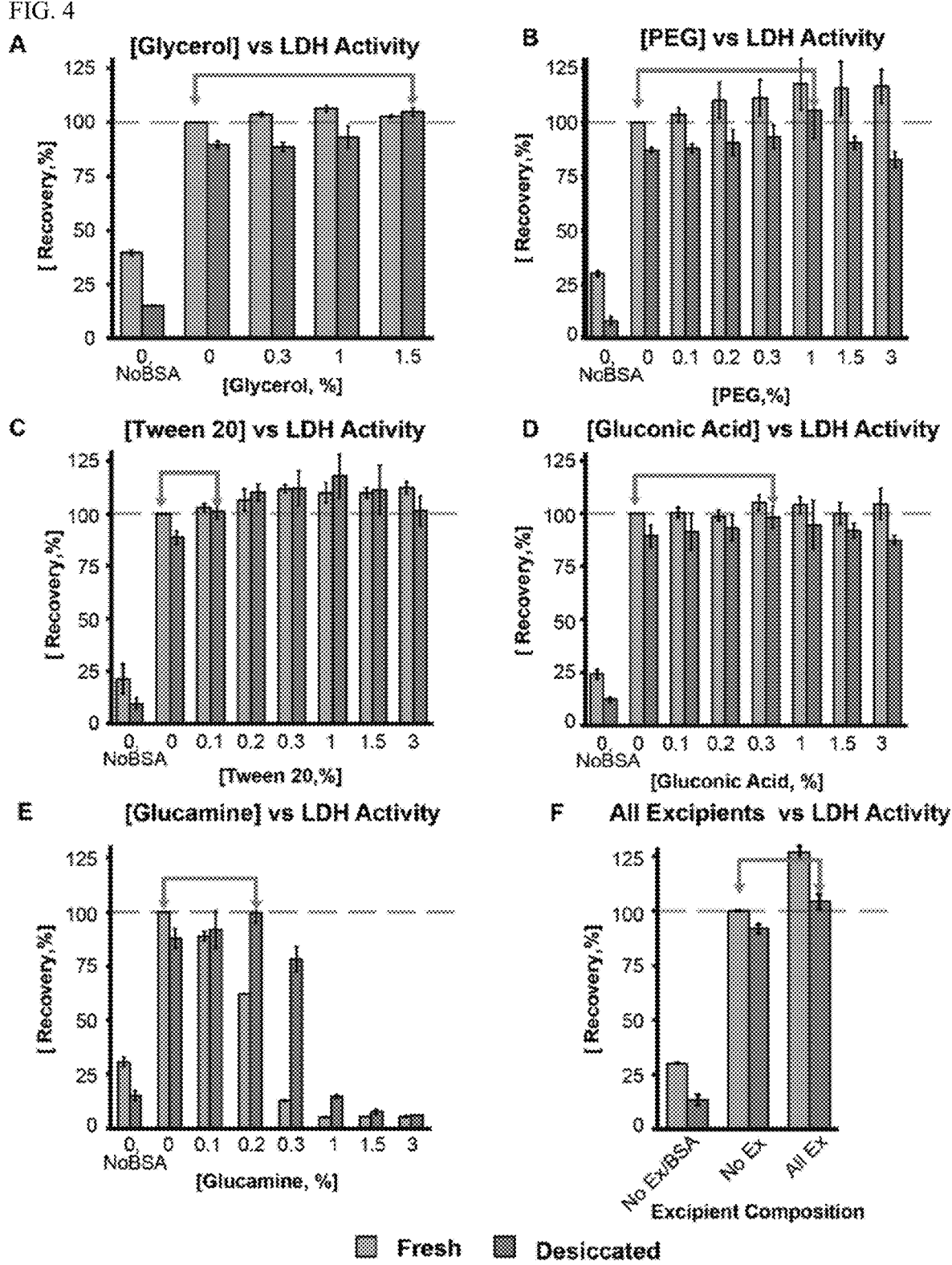
FIG. 4. Result for experiments on LDH using a model serum. Matrix optimization by monitoring LDH response to isothermal vitrification at the following conditions: Without any excipient, with each individual excipient at various concentrations, and with all excipients present at the determined optimum concentration. All values are relative to the fresh control without added excipients set at 100%. Error bars represent standard deviation from at least three independent experiments.

FIG. 4(A-F) illustrate the effect of various excipients on LDH activity in the model serum solution before and after desiccation. Fresh samples without BSA showed a significantly lower activity (29%±6%) compared to the control containing 50 g/L BSA. Desiccation of this sample resulted in a post-rehydration enzymatic activity of 12%±3%. BSA has been previously shown to stabilize multimeric enzymes including LDH from freezing-induced dissociation via preferential exclusion, which prefers the more compact multimer, with a lower surface area, and consequently lower chemical potential compared to the dissociated monomers. Desiccation of LDH in the model serum with the matrix containing only trehalose and dextran (V1) resulted in 89%±2% recovery of the enzymatic activity compared to the fresh control. The higher recovery of enzymatic activity in desiccated samples containing BSA compared to samples lacking BSA indicated that BSA provides a similar protection by stabilizing the multimeric form of LDH and conserving the multimer during drying and rehydration. Additionally, the high recovery in desiccated samples also indicates that the isothermal vitrification method can be used with minimal loss in activity.

To enhance the desiccation stability of LDH further and also to incorporate protection for a broader spectrum of biomarkers, additional excipients can be added to the lyoprotectant matrix in order to target specific damage mechanisms. Exemplary excipients include glycerol, polyethylene glycol, Tween 20, gluconic acid, glucamine, and/or an oxygen scavenger (e.g., vitamin C).

For example, glycerol is a non-toxic natural osmolyte and cryoprotectant that enhances protein stability and inhibits aggregation. Glycerol also can be an effective protein stabilizer at the glassy state as it acts synergistically with, for example, trehalose as a plasticizer to suppress fast vibrations in the glass, which otherwise can denature and/or deactivate proteins. The results for concentrations from 0.3% to 1.5% (v/v) glycerol are shown in FIG. 4A. Enzymatic activity in fresh samples containing the test concentrations of glycerol did not deviate significantly from the control containing no excipient. Generally, desiccated samples with increasing glycerol concentration produced increased LDH activity. The presence of 0.3% glycerol did not affect enzyme stability: 90%±2% for desiccated sample without glycerol versus and 89%±2% in the presence of glycerol. At 1% glycerol, the recovery rose to 93%±5% and the maximum recovery was achieved at 1.5% glycerol at 105%±2% and this concentration was used for further tests to develop a universal matrix. High concentrations of glycerol (10% (v/v)) can cause HAP aggregation in human serum while decreasing the $T_g$, 1.5% is much lower than this concentration and is not expected to result to aggregation.

Another exemplary excipient is polyethylene glycol (PEG), which is a water-soluble, biocompatible polymer that can stabilize serum albumin, the most abundant protein component of the blood. It also can protect multimeric proteins such as lactate dehydrogenase (LDH) and phosphofructokinase. PEG interacts directly with LDH, inhibiting dissociation of the LDH multimer during freeze/thaw and freeze-drying, a process that generates physical conditions similar to crowding in the desiccated state. Stabilization against crowding may be especially useful for preserving the activity of multimeric protein biomarkers during desiccation. Different PEG molecular weights (400 Da to 20 kDa) were initially tested and 8 kDa molecular weight PEG induced maximum stabilization (Data not shown). Thus, the molecular weight of the PEG can have a minimum molecular weight of at least 400 Da such as, for example, at least 1 kDa, at least 1.5 kDa, at least 2 kDa, at least 2.5 kDa, at least 3 kDa, at least 3.5 kDa, at least 4 kDa, at least 4.5 kDa, at least 5 kDa, at least 5.5 kDa, at least 6 kDa, at least 6.5 kDa, at least 7 kDa, at least 7.5 kDa, at least 8 kDa, at least 8.5 kDa, at least 9 kDa, at least 9.5 kDa, at least 10 kDa, at least 20 kDa, at least 25 kDa, at least 30 kDa, at least 35 kDa, at least 50 kDa, or at least 75 kDa. The molecular weight of the PEG can have a maximum molecular weight of no more than 100 kDa such as, for example, no more than 80 kDa, no more than 60 kDa, no more than 50 kDa, no more than 40 kDa, no more than 35 kDa, no more than 30 kDa, no more than 25 kDa, no more than 20 kDa, no more than 15 kDa, no more than 10 kDa, no more than 9 kDa, no more than 8 kDa, no more than 7 kDa, no more than 6 kDa, or no more than 5 kDa. The molecular weight of the PEG may be expressed as a range having endpoints defined by any minimum molecular weight set forth above and any maximum molecular weight set forth above that is greater than the minimum molecular weight. For example, in some embodiments, the PEG may have a molecular weight of from 0.4 kDa to 35 kDa. In another example, the PEG can have a molecular weight of from 1.5 kDa to 20 kDa. As another example, the PEG may have a molecular weight of from 1.5 kDa to 8 kDa. In one particular embodiment, the PEG can have a molecular weight of 8 kDa.

PEG concentrations from 0.1% to 3% (w/v) were tested against LDH stabilization (FIG. 4B). LDH in fresh samples containing PEG increased in activity proportional to excipient concentration and started to plateau from 1% to 3% PEG with an average activity of 117%±1% for all three samples. This effect may be due to crowding, which promotes the formation of the more active LDH tetramer from the dimer, which is more prevalent in serum conditions but exhibits lower activity. The same increase in activity was observed for desiccated samples but with an almost negligible increase in activity from 0.1% to 0.3% PEG compared to the sample desiccated without the excipient. Maximum activity was achieved at 1% PEG, while the activity started decreasing at higher concentrations. Samples containing PEG concentrations higher than 1% were observed to separate from the matrix after desiccation and likely caused heterogeneity and subsequent denaturation of the protein molecules that are not protected by the matrix (data not shown). 1% PEG was selected for further analyses.

Another exemplary excipient is Tween 20, which is a biocompatible surfactant that is often added to protein formulations to limit damage during processes such as purification, transportation, freeze-drying, spray drying, and/or storage. Tween 20 impedes surface or air-interface adsorption, which can otherwise result in unfolding and aggregation of proteins. Tween concentrations of 0.1% to 3% (v/v) were tested. As with PEG, LDH activity increased with increased Tween 20 concentration. The maximum activity achieved for fresh samples with 0.3% Tween 20 and an activity of 112%±2%. No significant change from this activity resulted from additional increase in Tween 20 concentration. For desiccated samples, maximum activity was observed in the presence of 1% Tween 20 with 118%±10% and started to decrease as more Tween 20 is added. Thus, 0.1% Tween 20 provided 103%±2% activity for fresh samples and 101%±4% recovery after desiccation (FIG. 4C). This concentration of Tween 20 was therefore selected for further study since it can stabilize a biomarker such that the activity levels in a fresh sample matches the activity of a sample subjected to desiccation and storage in the lyoprotectant matrix. This concentration is significantly lower than the concentration (0.5%) used during the initial investigation using serum samples from patients (FIG. 3), where aggregation of albumin was observed. Tween 20, at the lower concentration of 0.1%, increased stability of LDH compared to samples without the surfactant, while a further increase in Tween 20 concentration resulted in an overestimation of LDH after desiccation—i.e., significantly higher activity compared to unprocessed control.

Additional exemplary excipients are gluconic acid and glucamine (FIG. 4(D) and FIG. 4(E)), which can impede moisture-induced reductions in solubility due to aggregation of serum albumin under high relative humidity (97%) in the lyophilized state by excipient-water interaction, which competes against protein-water interaction. Gluconic acid and glucamine may therefore be useful for decreasing the likelihood of, and/or extent to which, isothermally vitrified are subjected to fluctuations in relative humidity during storage. Concentrations of 0.1% to 3% (w/v) for both excipients were tested. The presence of gluconic acid had minimum effect on the activity of fresh samples. For desiccated samples, activity increased with increasing gluconic acid concentration, reaching a maximum at 0.3% gluconic acid (98%±5%) followed by reduced activity with further increase in concentration (13%±2% with 3% gluconic acid). Adding glucamine to the matrix resulted to a decrease in LDH activity proportional to the glucamine concentration, with an almost complete loss in activity at concentrations greater than 0.3%. This behavior is more pronounced in fresh samples. For desiccated samples, LDH activity did not decrease significantly from 0.1% to 0.3% glucamine. At 0.2% glucamine, the maximum LDH activity was achieved with 100%±5% recovery, while further increase in excipient concentration resulted in a significantly reduced activity, with 96%±0% lost at 3% glucamine concentration. Thus, low levels of glucamine can promote protein stability by decreasing aggregation. A gluconic acid concentration of 0.3% and a glucamine concentration of 0.2% were selected for further testing.

In some embodiments, one can use a lyoprotectant matrix containing a mixture of excipients that target various denaturation mechanisms. For example, adding all of the exemplary excipients discussed immediately above resulted in an increase in fresh sample LDH activity (126%±3%). On the other hand, samples desiccated in the matrix containing all of the exemplary excipients discussed immediately above resulted to 104%±3% recovery, indicating that this matrix composition fairly reflects LDH that has been stabilized during desiccation and storage.

The exemplary matrix, which included five excipients at the concentrations that resulted in stabilization of LDH, was validated on an expanded number of proteins. The model biomarkers CRP, PSA, MMP-7, and C3a were selected. These proteins represent various sensitivities relevant to storage of biospecimens intended for future biomarker research. CRP and PSA show stability at conditions that are unfavorable to more sensitive biomarkers. MMP-7 and C3a represent more fragile biomarkers, with activity levels that are more easily altered by freezing and thawing, a process commonly experienced by liquid biospecimen during storage and subsequent analyses. ELISA experiments were conducted to determine protein recovery following desiccation and rehydration.

Figure 5:
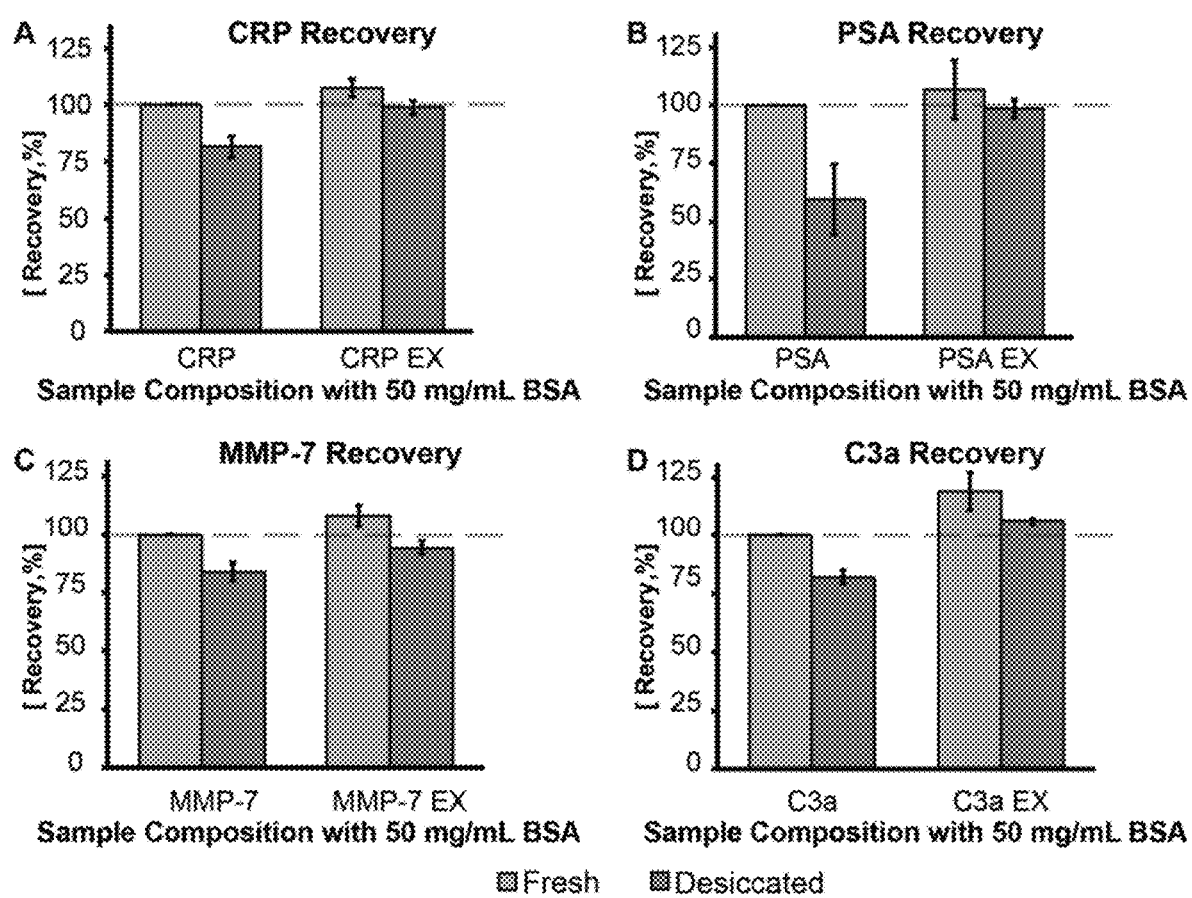
FIG. 5. Evaluation of optimized matrix and method on selected protein biomarkers representing various storage sensitivities. (A) CRP is stable to freezing, freeze-thaw, refrigeration and room temperature storage. (B) PSA is stable to freezing, freeze-thaw and refrigeration. (C) MMP-7 is stable to freezing and sensitive to freeze-thaw. (D) C3a is stable to freezing and unstable to freezing and thawing and refrigeration. Desiccation in the matrix containing all excipients resulted to enhanced stability compared to samples with TRE-DEX matrix alone. Error bars represent standard deviation from at least three independent experiments.

CRP is a stable biomarker with no significant change in activity during freezing, freeze-thawing (up to seven times), refrigeration, or storage at room temperature for up to 14 days. To determine the effect of the exemplary matrix on the sample without desiccation, model serum spiked with CRP was added to the matrix and the analyte level was measured. A moderately elevated level was obtained (107%±4%) compared to the sample without the matrix. Desiccation of the sample in the basic matrix (i.e., the trehalose and dextran version, with no additional excipients) resulted in 82%±5% recovery, while desiccation with the exemplary matrix including the excipients stabilized CRP with 99%±3% recovery (FIG. 5A).

PSA is a biomarker that exhibits stability to cryogenic storage, refrigerated storage, and repeated freezing and thawing (up time five times). Similar to the results with CRP, adding model serum spiked with PSA to the matrix without desiccation resulted to a moderate increase in the analyte level (107%±13%). Desiccating PSA in the basic matrix resulted in a reduced protein level of 59%±16% compared to the control. Desiccating in the exemplary matrix with excipients increased recovery to 99%±4% (FIG. 5B).

MMP-7 is highly sensitive to repeated freezing and thawing. MMP-7 in the model serum mixed with the exemplary excipients without desiccation exhibited a recovery of 108%±5% compared to the control. A recovery of 84%±4% was obtained when the MMP-7 was desiccated in the basic matrix. Recovery increased to 94%±3% when the sample was desiccated in the exemplary matrix containing the excipients (FIG. 5C).

C3a exhibits stability to freezing, but is sensitive to refrigerated storage and repeated freezing and thawing. An increase in C3a level of greater than 50% (compared to fresh controls) has been observed with freezing and thawing, which can obscure the analysis and result in a false positive diagnosis. As observed in the preceding experiments, samples of the model serum spiked with C3a stored in the exemplary matrix without desiccation exhibited an elevated C3a ELISA signal to 119%±8% compared to the control. Samples desiccated in the basic matrix resulted in 82%±3% recovery, while samples desiccated in the exemplary matrix with excipients had a recovery of 106%±1% (FIG. 5D).

Over the course of the last decade, room temperature stabilization technologies have attracted significant attention because of the potential for significant cost savings and less stringent requirements for processing, transport and storage. Thus, room temperature storage of biospecimens may be desirable, for example, in areas with poorly developed infrastructure, hard to reach geography, and/or combat zones.

This disclosure provides compositions and methods that relate to isothermal vitrification, a process by which liquids that contain large concentrations of sugars are desiccated to a "glass" (a very viscous fluid). In the glassy state, biochemical reactions, degradation of the biospecimen, and/or destabilization of macromolecules are inhibited. Benefits of isothermal vitrification include, for example, decreasing the cost and/or sample damage associate with freezing, decreasing the volume and/or weight of the biospecimen, reduced reliance on toxic chemicals, and/or labor associate with aliquoting subsamples from a stored specimen.

In one aspect, this disclosure describes a non-woven lyoprotectant matrix. Generally, the matrix includes a non-woven web prepared from one or more lyoprotective carbohydrates and one or more polymers (e.g., a polysaccharide). In some embodiments, the matrix can include one or more additional excipients, which may be selected to tailor the matrix for the desiccated storage of one or more particular biomarkers of interest.

While described herein in the context of an exemplary embodiment in which the non-woven matrix is producing by electrospinning, the non-woven matrix may be prepared by any suitable method. Thus, the matrix may be drylaid, airlaid, spunlaid, meltblown, or wetlaid and can include, for example extrusion and/or electrospinning. Generally, the matrix may be formed by any process that can produce the desired fiber diameter and porosity of the non-woven matrix.

The fibers can have a maximum average diameter of no more than 10 µm such as, for example, no more than 9 µm, no more than 8 µm, no more than 7 µm, no more than 6 µm, no more than 5 µm, no more than 4.5 µm, no more than 4 µm, no more than 3.5 µm, no more than 3 µm, no more than 2.5 µm, no more than 2 µm, no more than 1.5 µm, no more than 1 µm, no more than 0.9 µm, no more than 0.8 µm, no more than 0.7 µm, no more than 0.6 µm, or no more than 0.5 µm. The fibers of the matrix can have a minimum average diameter of at least 0.1 µm such as, for example, at least 0.2 µm, at least 0.3 µm, at least 0.4 µm, at least 0.5 µm, at least 0.6 µm, at least 0.7 µm, at least 0.8 µm, or at least 0.9 µm. In some embodiments, the fibers can have an average diameter expressed as a range having as endpoints a minimum average diameter set forth above and any maximum average diameter set forth above that is greater than the minimum average diameter. In some embodiments, the fibers can have an average diameter of from 0.3 µm to 0.7 µm such as, for example, from 0.4 µm to 0.5 µm. In other embodiments, the fibers can have an average diameter of 2 µm to 6 µm such as, for example, from 4 µm to 5 µm.

The matrix can exhibit a porosity that is measurable using the Apparent Opening Size (AOS) Test (ASTM D4751). This test measures the apparent maximum pore diameter of a fabric. The matrix can possess a maximum apparent pore size of no more than 500 µm such as, for example, no more than 400 µm, no more than 300 µm, no more than 200 µm, no more than 100 µm, no more than 90 µm, no more than 80 µm, no more than 70 µm, no more than 60 µm, no more than 50 µm, no more than 45 µm, no more than 40 µm, no more than 35 µm, no more than 30 µm, no more than 25 µm, no more than 20 µm, no more than 15 µm, or no more than 10 µm. The matrix can possess a minimum apparent pore size of at least 0.1 µm such as, for example, at least 0.5 µm, at least 1 µm, at least 2 µm, at least 3 µm, at least 4 µm, at least 5 µm, at least 6 µm, at least 7 µm, at least 8 µm, at least 9 µm, at least 10 µm, at least 11 µm, at least 12 µm, at least 13 µm, at least 14 µm, at least 15 µm, at least 16 µm, at least 17 µm, at least 18 µm, at least 19 µm, at least 20 µm, at least 25 µm, at least 30 µm, at least 35 µm, at least 40 µm, at least 45 µm, or at least 50 µm. The matrix can possess an apparent pore size expressed as a range having as endpoints any maximum apparent pore size set forth above and any minimum apparent pore size set forth above that is less than the maximum apparent pore size. In some embodiments, the matrix can possess an apparent pore size of from 1 µm to 100 µm.

While described herein in the context of a matrix prepared from trehalose and dextran, the matrix may be prepared from any suitable lyoprotectant carbohydrate or lyoprotectant combination of carbohydrates. Table 1 lists some exemplary alternative lyoprotective carbohydrates. The matrix also can include a lyoprotective polymer. For example, polyvinylpyrrolidone (PVP) possesses a relatively high $T_g$ (approximately 90° C. to 189° C., depending on molecular weight and moisture content) and can be used as a substitute for dextran under appropriate circumstances. In other embodiments, the polymer can include polyvinyl alcohol (PVA).

TABLE 1

Exemplary lyoprotectant carbohydrates

| Sugar | Glass Transition Temperature—$T_g$ (° C.) |
|---|---|
| Sorbitol | −3 |
| Mannitol | 13 |
| Lactose | 110 |
| Sucrose | 67 |
| Glucose | 52 |
| Maltose | — |
| Myo-Inositol | 221 |
| Raffinose | 112 |
| Trehalose | 115 |
| Dextran | 220 |

Thus, for example, a lyoprotectant combination of carbohydrates can include sucrose. In some embodiments, the combination can include a sufficient amount of an alternative lyoprotectant carbohydrate to provide a desired quality to the mixture. As one example, an amount of sucrose may be added to a dextran-trehalose combination that is sufficient to decrease the extent to which the trehalose may be susceptible to crystallization.

A polymer component of the lyoprotectant matrix—whether a polysaccharide such as dextran or an alternative polymer such as PVP or PVA—can be selected to have a maximum molecular weight of no more than 300 kDa such as, for example, no more than 250 kDa, no more than 200 kDa, no more than 150 kDa, no more than 100 kDa, no more than 90 kDa, no more than 85 kDa, no more than 80 kDa, no more than 75 kDa, no more than 70 kDa, no more than 65 kDa, no more than 60 kDa, no more than 55 kDa, or no more than 40 kDa. A polymer component of the lyoprotectant matrix can be selected to have a minimum molecular weight of at least 20 kDa such as, for example, at least 25 kDa, at least 30 kDa, at least 35 kDa, at least 40 kDa, at least 45 kDa, at least 50 kDa, at least 55 kDa, at least 60 kDa, at least 65 kDa, at least 70 kDa, at least 75 kDa, at least 80 kDa, at least 85 kDa, or at least 90 kDa. A polymer component of the matrix can be selected to have a molecular weight that falls within a range having as endpoints any maximum polymer molecular weight set forth above and any minimum polymer molecular weight set forth above that is less than then maximum molecular weight.

Regardless of the particular method used to prepare the lyoprotectant matrix, one can prepare a matrix "cocktail" that includes the matrix components and any excipients as set forth in detail below. In the description that follows, unless otherwise indicated, concentrations of matrix components and excipients are provided in the context of the matric cocktail from which the lyoprotectant matrix is prepared.

The cocktail used to produce the lyoprotectant matrix include a lyoprotective carbohydrate component and a polymer component. In some embodiments, the lyoprotective carbohydrate component can include a monosaccharide or disaccharide, a combination of monosaccharides, a combination of disaccharides, or a combination of monosaccharides or disaccharides. Exemplary suitable monosaccharides and disaccharides are listed in Table 1. The lyoprotective carbohydrate component may be provided at a minimum concentration of at least 0.5 M such as, for example, at least 0.6 M, at least 0.7 M, at least 0.8 M, at least 0.9 M, at least 1 M, at least 1.1 M, or at least 1.2 M. The lyoprotective carbohydrate component may be provided at a maximum concentration of no more than 2 M such as, for example, no more than 1.8 M, no more than 1.7 M, no more than 1.6 M, no more than 1.5 M, no more than 1.4 M, no more than 1.3 M, no more than 1.2 M, no more than 1.1 M, or no more than 1 M. In some embodiments, the concentration of the lyoprotective carbohydrate component may expressed as a range having as endpoints any minimum lyoprotective carbohydrate component concentration set forth above and any maximum lyoprotective carbohydrate component concentration set forth above that is greater than the minimum lyoprotective carbohydrate component concentration. For example, in some embodiments, the lyoprotective carbohydrate component may be provided at a concentration of from 0.8 M to 1.2 M.

The polymer component—again, regardless of whether the polymer is a polysaccharide such as dextran or an alternative polymer such as PVP or PVA—may be provided at a concentration of from 0.1 g/mL to 5 g/mL. Within this range, the polymer component may have a minimum concentration of at least 0.1 g/mL such as, for example, at least 0.2 g/mL, at least 0.3 g/mL, at least 0.4 g/mL, at least 0.5 g/mL, at least 0.6 g/mL, at least 0.7 g/mL, at least 0.8 g/mL, at least 0.9 g/mL, at least 1 g/mL, at least 1.5 g/mL, at least 2 g/mL, or at least 2.5 g/mL. Also within this range, the polymer component may have a maximum concentration of no more than 5 g/mL such as, for example, no more than 4.5 g/mL, no more than 4 g/mL, no more than 3.5 g/mL, no more than 3 g/mL, no more than 2.5 g/mL, no more than 2 g/mL, no more than 1.5 g/mL, or no more than 1 g/mL. In some embodiments, the polymer component may be present at a concentration within a range having as endpoints any maximum polymer concentration set forth above and any minimum polymer concentration set forth above that is less than the maximum polymer concentration. For example, in some embodiments, the polymer component may be present at a concentration of from 0.3 g/mL to 1 g/mL. In certain embodiments, the polymer component may be present at a concentration of 1 g/mL. In one particular embodiment, the polymer component present at a concentration of 1 g/mL includes dextran.

The matrix—and, therefore, the matrix cocktail from which the matrix is prepared—can optionally include one or more excipients that may be included in the matrix cocktail at a v/v concentration of from 0.05% to 10%. While described herein in the context of exemplary embodiments that include glycerol, PEG, Tween 20, gluconic acid, and/or glucamine, the matrix may be prepared to include any suitable excipient and/or combination of excipients. In some cases, an excipient may be selected based on its known ability to limit destabilization and/or damage to a biomarker of interest in a biospecimen. Thus, in some embodiments, a matrix designed for storing a biospecimen that will be analyzed for a particular biomarker can include one or more excipients selected specifically because of the lyoprotective effect of the excipient on the biomarker of interest. In other embodiments, a matrix may be prepared so that it reflects a generic or nearly universal storage matrix that may be used for a significant plurality of biospecimens and is capable of lyoprotecting a plurality of commonly assayed biomarkers.

Thus, a lyoprotectant matrix can include one or more excipients such as, for example, an amino acid (e.g., L-arginine, glycine-betaine, sodium glutamate, methionine, iso-leucine, glutamic acid, glycine, histidine, lysine, cysteine, or tryptophan), an antioxidant (e.g., ascorbic acid, methionine, glutathione, propyl gallate, butylated hydroxyl anisole, or butylated hydroxytoluene), a polymer (e.g., oligoarginine or oligolysine attached to PEG, hydroxyethyl starch, heparin, polyacrylic acid, hydroxypropyl-β-cyclodextrin, Ficoll 70, polyvinylpyrrolidone, or polysorbate 80), a carbohydrate (e.g., sucrose), and/or a bulking agent (algin, lactalbumin, peptone, bovine serum albumin, gelatin, skimmed milk, casein, or casitone).

When present, glycerol may be present in the matrix cocktail at a maximum concentration of less than 10% (v/v) such as, for example, no more than 9.5%, no more than 9%, no more than 8.5%, no more than 8%, no more than 7.5%, no more than 7%, no more than 6.5%, no more than 6%, no more than 5.5%, no more than 5%, no more than 3.5%, no more than 3%, no more than 2.5%, no more than 2%, no more than 1.5%, no more than 1%, no more than 0.5%, or no more than 0.25%. In some embodiments, glycerol, when present, may be present at a minimum concentration of at least 0.01% such as, for example, at least 0.1%, at least 0.25%, at least 0.5%, at least 1%, at least 1.5%, at least 2%, at least 2.5%, at least 3%, at least 3.5%, at least 4%, at least 4.5%, at least 5%, at least 5.5%, at least 6%, or at least 7%. In some embodiments, glycerol may be present in an amount within a range having endpoints defined by any maximum amount set forth above and any minimum amount set forth above that is less than the maximum amount. For example, glycerol may be provided at a concentration of from 0.1% to 1.5%. In another example, glycerol may be provided in a concentration of from 0.1% to 3%. In one particular embodiment, glycerol may be provided at a concentration of 3%.

When present, PEG may be present in the matrix cocktail at a maximum concentration of less than 10% (v/v) such as, for example, no more than 9.5%, no more than 9%, no more than 8.5%, no more than 8%, no more than 7.5%, no more than 7%, no more than 6.5%, no more than 6%, no more than 5.5%, no more than 5%, no more than 3.5%, no more than 3%, no more than 2.5%, no more than 2%, no more than 1.5%, no more than 1%, no more than 0.5%, or no more than 0.25%. In some embodiments, PEG, when present, may be present at a minimum concentration of at least 0.01% such as, for example, at least 0.1%, at least 0.25%, at least 0.5%, at least 1%, at least 1.5%, at least 2%, at least 2.5%, at least 3%, at least 3.5%, at least 4%, at least 4.5%, at least 5%, at least 5.5%, at least 6%, or at least 7%. In some embodiments, PEG may be present in an amount within a range having endpoints defined by any maximum amount set forth above and any minimum amount set forth above that is less than the maximum amount. For example, PEG may be provided at a concentration of from 0.1% to 10%. In another example, PEG may be provided at a concentration of 0.1% to 1.5%. In another example, PEG may be provided in a concentration of from 0.3% to 1%. In one particular embodiment, PEG may be provided at a concentration of 1%.

When present, Tween 20 may be present at a maximum concentration of less than 10% (v/v) such as, for example, no more than 9.5%, no more than 9%, no more than 8.5%, no more than 8%, no more than 7.5%, no more than 7%, no more than 6.5%, no more than 6%, no more than 5.5%, no more than 5%, no more than 3.5%, no more than 3%, no more than 2.5%, no more than 2%, no more than 1.5%, no more than 1%, no more than 0.5%, or no more than 0.25%. In some embodiments, Tween 20, when present, may be present at a minimum concentration of at least 0.01% such as, for example, at least 0.1%, at least 0.2%, at least 0.3%, at least 0.4%, at least 0.5%, at least 0.6%, at least 0.7%, at least 0.8%, at least 0.9%, at least 1%, at least 1.5%, at least 2%, at least 2.5%, at least 3%, at least 3.5%, at least 4%, at least 4.5%, at least 5%, at least 5.5%, at least 6%, or at least 7%. In some embodiments, Tween 20 may be present in an amount within a range having endpoints defined by any maximum amount set forth above and any minimum amount set forth above that is less than the maximum amount. For example, Tween 20 may be provided at a concentration of from 0.1% to 10%. In another example, Tween 20 may be provided at a concentration of 0.1% to 1.5%. In another example, Tween 20 may be provided in a concentration of from 0.1% to 3%. In one particular embodiment, Tween 20 may be provided at a concentration of 0.3%.

When present, gluconic acid may be present in the matrix cocktail at a maximum concentration of less than 10% (v/v) such as, for example, no more than 9.5%, no more than 9%, no more than 8.5%, no more than 8%, no more than 7.5%, no more than 7%, no more than 6.5%, no more than 6%, no more than 5.5%, no more than 5%, no more than 3.5%, no more than 3%, no more than 2.5%, no more than 2%, no more than 1.5%, no more than 1%, no more than 0.5%, or no more than 0.25%. In some embodiments, gluconic acid, when present, may be present at a minimum concentration of at least 0.01% such as, for example, at least 0.1%, at least 0.2%, at least 0.3%, at least 0.4%, at least 0.5%, at least 0.6%, at least 0.7%, at least 0.8%, at least 0.9%, at least 1%, at least 1.5%, at least 2%, at least 2.5%, at least 3%, at least 3.5%, at least 4%, at least 4.5%, at least 5%, at least 5.5%, at least 6%, or at least 7%. In some embodiments, gluconic acid may be present in an amount within a range having endpoints defined by any maximum amount set forth above and any minimum amount set forth above that is less than the maximum amount. For example, gluconic acid may be provided at a concentration of from 0.1% to 10%. In another example, gluconic acid may be provided at a concentration of 0.1% to 3%. In another example, gluconic acid may be provided in a concentration of from 0.3% to 1%. In one particular embodiment, gluconic acid may be provided at a concentration of 0.3%.

When present, glucamine may be present in the matrix cocktail at a maximum concentration of less than 10% (v/v) such as, for example, no more than 9.5%, no more than 9%, no more than 8.5%, no more than 8%, no more than 7.5%, no more than 7%, no more than 6.5%, no more than 6%, no more than 5.5%, no more than 5%, no more than 3.5%, no more than 3%, no more than 2.5%, no more than 2%, no more than 1.5%, no more than 1%, no more than 0.5%, or no more than 0.25%. In some embodiments, glucamine, when present, may be present at a minimum concentration of at least 0.01% such as, for example, at least 0.1%, at least 0.2%, at least 0.3%, at least 0.4%, at least 0.5%, at least 0.6%, at least 0.7%, at least 0.8%, at least 0.9%, at least 1%, at least 1.5%, at least 2%, at least 2.5%, at least 3%, at least 3.5%, at least 4%, at least 4.5%, at least 5%, at least 5.5%, at least 6%, or at least 7%. In some embodiments, glucamine may be present in an amount within a range having endpoints defined by any maximum amount set forth above and any minimum amount set forth above that is less than the maximum amount. For example, glucamine may be provided at a concentration of from 0.1% to 10%. In another example, glucamine may be provided at a concentration of 0.1% to 3%. In another example, glucamine may be provided in a concentration of from 0.3% to 1%. In one particular embodiment, glucamine may be provided at a concentration of 0.2%.

The liquid biospecimen preserved using the lyoprotectant matrix can be any suitable liquid biospecimen. Exemplary liquid biospecimens include whole blood, serum, plasma, saliva, tears, sputum, buccal swabs, bronchial lavage fluid, cerebrospinal, ascites fluid, synovial fluid, urine, or any other bodily fluid.

One feature of the lyoprotectant matrix is that the matrix adsorbs and dissolves so that the lyoprotective materials in the matrix are uniformly distributed in the liquid biospecimen. As used herein, the term "uniformly distributed" refers to the character of a mixture of at least a portion of a liquid biospecimen and at least a portion of the lyoprotectant matrix in which the mixture exhibits no clumping of the lyoprotective carbohydrate and/or no skin formation visible to the unaided naked eye.

In another aspect, this disclosure describes the desiccated storage and reconstitution of a liquid biospecimen that includes at least one biomarker of interest. Generally, the method includes providing any embodiment of the lyoprotectant matrix described herein, introducing at least a portion of a liquid biospecimen to the lyoprotectant matrix, drying the specimen-loaded matrix, and storing the dried specimen-loaded matrix.

The liquid biospecimen may be obtained by any conventional method for obtaining a liquid biospecimen from a subject.

The specimen-loaded matrix may be dried by any suitable method. In some embodiments, the specimen-loaded matrix may be air-dried. In other embodiments, the specimen-loaded matrix may be vacuum dried. The specimen-loaded matrix may be dried for any suitable length of time to reduce the water content of the matrix-specimen mixture to no more than 25% such as, for example, no more than 20%, no more than 15%, no more than 10%, no more than 7%, no more than 6.8%, no more than 6.6%, no more than 6.4%, no more than 6.2%, no more than 6%, no more than 5.8%, no more than 5.6%, no more than 5.4%, no more than 5.2%, no more than 5%, no more than 4.8%, no more than 4.6%, no more than 4.4%, no more than 4.2%, no more than 4%, no more than 3.8%, no more than 3.6%, no more than 3.4%, no more than 3.2%, no more than 3%, no more than 2.8%, no more than 2.6%, no more than 2.4%, no more than 2.2%, or no more than 2%. In some embodiments, drying the specimen-loaded matrix for 24 hours resulted in a water content of 7%. In other embodiments, vacuum drying the specimen-loaded matrix for 12 hours resulted in a water content of 20%.

In some embodiments, the specimen-loaded matrix may be vacuum dried for a minimum of at least four hours such as, for example, at least five hours, at least six hours, at least seven hours, at least eight hours, at least nine hours, at least ten hours, at least 11 hours, or at least 12 hours. The specimen-loaded matrix may be vacuum dried for a maximum of no more than 24 hours such as, for example, no more than 12 hours, no more than 11 hours, no more than ten hours, no more than nine hours, no more than eight hours, no more than seven hours, no more than six hours, or no more than five hours. The specimen-loaded matrix may be vacuum dried for a period defined by a range having as endpoints any minimum time listed above and any maximum time listed above that is greater than the selected minimum time. In certain embodiments, the specimen-loaded matrix may be vacuum dried may be vacuum dried for 4 hours, five hours, six hours, eight hours, ten hours, or 12 hours.

The dried specimen-loaded matrix may be stored at any suitable temperature such as, for example, a temperature below the glass transition temperature of the lyoprotectant matrix. So, for example, a specimen loaded onto a lyoprotective matrix prepared from trehalose and dextran can be readily stored at room temperature. Alternative lyoprotective matrices prepared from alternative materials—such as those listed in Table 1—may dictate a storage temperature at which the dried specimen-matrix mixture that is appropriate when the specified lyoprotectant matrix is used.

The dried specimen-loaded matrix may be stored in this manner for a period of at least two years. For example, long-term stability study of LDH as a model biomarker was studied. LDH was spiked in serum and dried for four hours in the matrix. After six months of storage, LDH activity was 101±2% when stored using the matrix containing excipients (V1EX, containing glycerol, Tween 20, PEG, gluconic acid, and glucamine as excipients), indicating that no significant change compared to the fresh samples has occurred at this point (FIG. 6). LDH also shows stability in the matrix without the excipients (V1) in the first three months but dropped to 94±4% on the six-month time point (FIG. 6).

Since the glass transition temperature of the previous method only allows for storage in a refrigerator, further efforts have been focused on increasing the glass transition ($T_g$) temperature of the sample in order for room temperature storage to be possible. As $T_g$ is influenced by the water content of the sample (e.g., 1% water can decrease $T_g$ by 10° C.), drying under vacuum at different time periods followed by water content analysis was conducted. After five hours of desiccation, the water content levels off to less than 20%, while overnight desiccation brings the water content to 10%. Drying 150 µL of serum in 250 mg matrix resulted to a $T_g$ of 81±6° C. for V1 and 50±5° C. for V1EX (Table 2). Both $T_g$ values will allow for storage at room temperature. These experiments were conducted using different matrix-to-serum ratios, where 150 µL of serum was mixed with 25 mg, 50 mg, or 250 mg of matrix to determine if the amount of matrix influenced the extent of stabilization (Table 2). 50 mg of matrix results in a higher $T_g$ at shorter desiccation periods, with lower standard deviation. Overnight drying gave all samples a similar $T_g$ of 73° C. to 81° C. for V1 and 50° C. for V1EX, both of which will allow for room temperature storage of the biospecimens.

TABLE 2

| | $T_g$ (° C.) | | |
|---|---|---|---|
| Matrix composition | 25 mg | 50 mg | 250 mg |
| Four hours of drying | | | |
| V1 | −26 | 7 | 30 |
| V1EX | 1 | 11 ± 4 | 11 |
| Five hours of drying | | | |
| V1 | 32 ± 4 | 29 | 50 |
| V1EX | 26 ± 21 | 17 ± 7 | 8 |
| Overnight drying | | | |
| V1 | 73 ± 5 | 78 ± 6 | 81 ± 6 |
| V1EX | 50 ± 8 | 50 ± 6 | 50 ± 5 |

Figure 7:
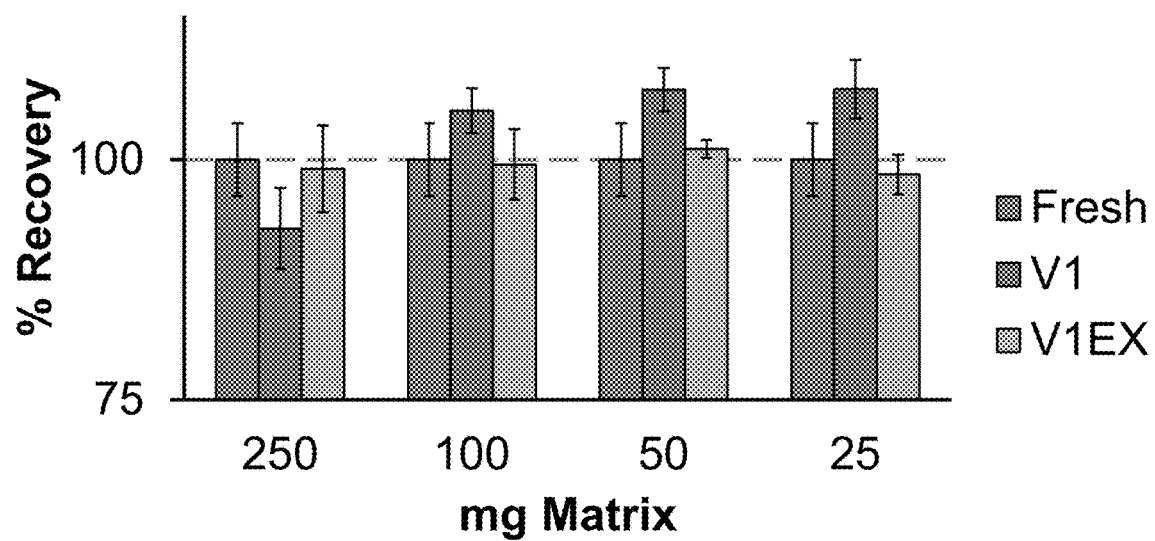

The effect of matrix-to-serum ratio on LDH recovery was also tested to identify the smallest amount of matrix that will enable biomarker protection and serum stabilization. The use of the matrix with excipients (V1EX) resulted in complete recovery of LDH for all matrix-to-serum ratios after overnight drying (FIG. 7). For V1 (the matrix containing only the lyoprotectants, trehalose, and dextran), a significantly higher LDH activity is observed at low matrix-to-serum ratio, while 250 mg of matrix significantly reduced the enzyme activity to 93±4%.

Figure 8:
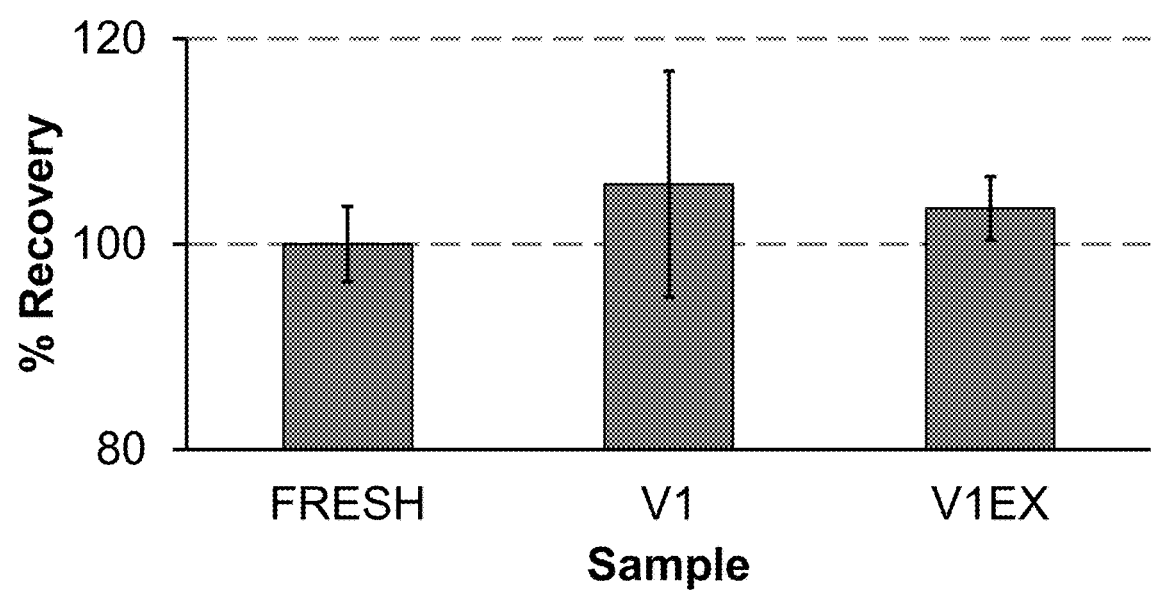

The stability of the biomarker C-reactive protein was determined using 50 mg of matrix and overnight drying and the result show complete recovery of CRP in both matrices, but with V1 having a larger standard deviation than V1EX indicating greater sample heterogeneity (FIG. 8). The stability of test biomarkers in a reduced amount of matrix will allow storage at 96-well plates, or for higher volumes of sample (up to 1 mL), in 24 well-plates, augmenting storage efficiency.

Long-term stability of a desiccated biospecimen also can be evaluated using accelerated aging techniques that are conventional and well-known to those of ordinary skill in the art. Using such techniques, one can assess the stability of samples that have been aged to correspond to, for example, up to 12 years of storage. Samples that demonstrate stability after being subjected to accelerated aging that corresponds to 12 years of storage can be concluded to remain stable for even longer periods of time.

After storage, the dried specimen-loaded matrix may be rehydrated to reconstitute the liquid biospecimen so that the contents of the sample, including at least one biomarker of interest, can be analyzed. The liquid biospecimen may be reconstituted by simply adding purified water to the dried specimen-loaded matrix. If one requires only a portion of the dried specimen for analysis, a piece of the dried specimen-loaded matrix may be broken off and used while the remainder of the dried specimen-loaded matrix is left intact. No further manipulation of the dried specimen-loaded matrix is necessary. In contrast, if one requires only a portion of a frozen liquid specimen for analysis, one must thaw the frozen liquid specimen, remove an aliquot of the liquid specimen, and re-freeze the unused portion of the liquid specimen. This process can influence the stability and/or activity of biomarkers remaining in the unused portion of the liquid specimen as a result of undergoing a freeze-thaw cycle and, in some cases, many freeze-thaw cycles as a result of repeated aliquoting of the specimen.

Thus, this disclosure describes an exemplary basic electrospun matrix of trehalose and dextran. This disclosure further describes a more complex exemplary matrix that includes one or more additional excipients. The exemplary matrix containing the excipients illustrates that the basic matrix (V1) can be tailored to meet the storage requirements of a broad spectrum of biomarkers that may be present in a given biospecimen. The exemplary matrix with excipients (V1EX) further illustrates that the basic matrix can be designed to meet the storage requirements of a plurality of biomarkers so that a general matrix composition can be designed to accommodate storage of many different biomarkers. For example, the model biomarker LDH is known for its sensitivity to processes such as dilution, freezing, and freeze-thaw. Desiccating model serum containing the enzyme in the basic matrix resulted to 89%±2% activity compared to control of fresh model serum spiked with LDH. The recovered LDH activity was even closer to the fresh sample control using an exemplary matrix containing excipients—e.g., 0.3% glycerol, 0.1% Tween 20, 1% PEG, 0.3% gluconic acid, and 0.2% glucamine. The exemplary matrix containing excipients was further validated using four model protein biomarkers, CRP, PSA, MMP-7, and C3a, which represented various storage sensitivities. Complete recovery of both CRP and PSA was achieved after desiccation in the exemplary matrix with excipients. Recovery of greater than 90% was achieved for MMP-7 and C3a after desiccation in the exemplary matrix with excipients.

In the preceding description and following claims, the term "and/or" means one or all of the listed elements or a combination of any two or more of the listed elements; the terms "comprises," "comprising," and variations thereof are to be construed as open ended—i.e., additional elements or steps are optional and may or may not be present; unless otherwise specified, "a," "an," "the," and "at least one" are used interchangeably and mean one or more than one; and the recitations of numerical ranges by endpoints include all numbers subsumed within that range (e.g., 1 to 5 includes 1, 1.5, 2, 2.75, 3, 3.80, 4, 5, etc.).

In the preceding description, particular embodiments may be described in isolation for clarity. Unless otherwise expressly specified that the features of a particular embodiment are incompatible with the features of another embodiment, certain embodiments can include a combination of compatible features described herein in connection with one or more embodiments.

For any method disclosed herein that includes discrete steps, the steps may be conducted in any feasible order. And, as appropriate, any combination of two or more steps may be conducted simultaneously.

The present invention is illustrated by the following examples. It is to be understood that the particular examples, materials, amounts, and procedures are to be interpreted broadly in accordance with the scope and spirit of the invention as set forth herein.

EXAMPLES

Chemicals

Experiments were performed using trehalose dihydrate (>99% purity, Ferro-Pfanstiehl Laboratories, Waukegan, Ill.), dextran (35-45 kDa) and bovine serum albumin (>98% Purity, Sigma-Aldrich, St. Louis, Mo.) and 1× Dulbecco's phosphate buffered saline solution (14190-144, Invitrogen Corporation, Burlington, Ontario, Canada). All other chemicals (unless indicated) were purchased from Sigma-Aldrich, St. Louis, Mo.

Lyoprotectant Cocktail Design

The lyoprotectant cocktail was mainly composed of dextran and trehalose (called "components"). Trehalose provides lyoprotectant functionality while dextran increases the glass transition temperature of the lyoprotectant cocktail to facilitate isothermal vitrification.

In order to further enhance stability of the biomarkers, five minor excipients (called "excipients"); glycerol, polyethylene glycol (PEG), Tween 20, gluconic acid, and glucamine were added to the trehalose-dextran cocktail. The lyoprotectant cocktail designated V1EX includes 1.5% glycerol, 0.1% Tween 20, 1% PEG, 0.3% gluconic acid, and 0.1% glucamine.

Electrospinning

To prepare the electrospinning solution, 20 mL of distilled water was used to dissolve trehalose and dextran at concentrations of 0.4 g/mL and 1 g/mL, respectively. First, trehalose was dissolved by stirring at 200 RPM for 45 minutes, then dextran was added at multiple steps and the mixture was allowed to stir overnight (16 hours) at 200 RPM. The solution was stirred at 150 RPM the following day for three hours to eliminate most of the bubbles that formed during mixing and then the solution was allowed to rest for an additional 12 hours to ensure total dissolution. The solution was stored at 4° C. when not in use. If present, excipients were then added to the solution.

The resultant lyoprotectant cocktail was filled into a 1 mL syringe connected to a stainless steel 18-gage 0.5" long blunt-end needle. The syringe was then inserted into a multi-channel syringe-pump (NE-1600 multi-syringe pump; New Era Pump Systems, Farmingdale, N.Y.) and the solution was extruded at a flowrate of 0.03 mL/min. Electrospinning was conducted in a controlled environment chamber (Electro-tech Systems, Inc., Glenside, Pa.) with the relative humidity kept constant at 50%. The tip of the needle was kept at a 15 cm distance from an aluminum target and a voltage differential of 15-20 kV was applied (between the tip of the needle and the target). The voltage applied depended on the number of tips used simultaneously for production (15 kV for one tip, 18 kV for two tips, and 20 kV for three tips). These conditions resulted in uniform electrospun fiber diameter (0.4 µm to 0.5 µm) production with an inter-fiber distance in the matrix that allowed desired capillary adsorption speed and desired dissolution rate, resulting in a well-controlled architecture (FIGS. 1(A) and (B)). Every four hours, electrospun fibers were collected from the target and the syringes were refilled with fresh lyoprotectant cocktail. All collected electrospun fibers were sealed and stored at 4° C. if not used immediately.

Characterization—SEM Imaging and Water Content Analysis

Characterization of the electrospun fiber diameter size distribution and the interfiber distance in the matrix was performed by SEM imaging. For this purpose, a Hitachi 4700 Field-emission scanning electron microscope (FE-SEM) was used. The specimens for SEM imaging were gold-palladium coated with a VCR ion beam sputter coater at a working distance of 5 mm and an accelerating voltage of 5 kV. To examine the effects of water content on the fiber morphology, samples were harvested in triplicate and dried in a vacuum oven for up to 72 hours. Water content was determined by heating the samples to 130° C. for 60 minutes and calculating the change in the sample weight.

Characterization—Glass Transition Temperature

The glass transition temperature of the desiccated serum samples adsorbed into the electrospun matrix was measured using a TA Instruments Inc. (New Castle, Del.) Q1000 differential scanning calorimeter. Sample to be tested (weighing 2-10 mg) was loaded into hermetically sealed aluminum pans. The sample was then rapidly cooled down to −60° C., equilibrated for 15 minutes and then warmed up to 150° C. at a uniform ramp rate of 2° C./min. Shift in the DCS scan baseline indicated a glass transition and the corresponding temperature was recorded.

Model Serum/Serum Samples

Human blood samples were collected from volunteers through the University of Minnesota's (UMN) Tissue Procurement Facility (TPF) following a UMN Institutional Review Board (IRB) approved protocol (Study Number: 1011E92892). Whole blood was processed to separate serum by allowing it to clot for approximately 20-30 minutes after receipt of the samples from TPF. Each vial of whole blood produced approximately 40% the blood volume as sera. The clotted blood was then centrifuged for 10 minutes at 2000 RCF. The serum (the supernatant) was then carefully aspirated at room temperature and placed into a new centrifuge tube, taking care not to disturb the cell layer or transfer any cells. Serum samples were then aliquoted into microcentrifuge tubes and allocated to different experimental groups as detailed in Table 3.

TABLE 3

Experiments Conducted to Determine High Abundance Protein (HAP) Stability in Desiccated, Frozen, or Frozen/Thawed Human Serum

| Experiments Run | Preservation Protocol | Storage Conditions Time | Methods used for Stability Evaluation ⇒ Conclusion |
|---|---|---|---|
| Human Serum (n = 3) | IV* in V1, V2 and V3 (vs. fresh control) | 20° C., 0% RH for 1, 3, 7, 16, 18, 20, 22 days | Silver Stain, Western Blot for Albumin and Haptoglobin ⇒ HAP aggregation in dried samples that were sealed |
| Human Serum (n = 3) | IV in V2, V3 vs. freezing at −20° C. or −80° C. (vs. fresh control) | 20° C., 0% RH for 1, 3, 7 days | Silver Stain, Western Blot for Albumin and Haptoglobin, ⇒ HAP aggregation in dried samples that were sealed, degradation in frozen samples |
| Human Serum (n = 2) | IV in V3 vs. freezing at −20° C. or −80° C. (vs. fresh control) | 4° C. or 20° C., 0% RH for 1, 3, 7 days with/without UV exposure | Silver Stain, Western Blot for Albumin and Haptoglobin ⇒ Significant decrease in HAP aggregation ⇒ Liquid sera samples stored in cryogenic conditions have high molecular weight aggregates in silver staining |
| Human Serum (n = 2) | IV in V2, V3 vs. 4° C., freezing at −20° C. or −80° C., 5 Freeze/Thaw to −80° C. (vs. fresh control) | 4° C. or 20° C., 0% RH for 1, 2, 4, 6 weeks with/without UV exposure | Silver Stain, Western Blot for Albumin and Haptoglobin/ ⇒ Frozen state storage causes aggregation/degradation equal to or greater than stabilization matrix ⇒ Significant aggregation during freeze/thaw ⇒ A high molecular weight band which appears predominantly in samples stored at 4° C. |
| Human Serum (n = 3) | IV in V3 vs. freezing at −20° C. or −80° C., 5 Freeze/Thaw to −80° C. (vs. fresh control) | 4° C. or 20° C., 50% RH for 1 week | Silver Stain, Western Blot for Albumin and Haptoglobin/ ⇒ Degradation in 50% RH samples ⇒ Serum dried w/o lyoprotectant cocktail aggregated the worst |
| Human Serum (n = 3) | IV in V2, V3 vs. freezing at −20° C. or −80° C. | 4° C. or 20° C. for 2 years with/without UV exposure | Silver Stain, Western Blot for Albumin and Haptoglobin/ |

*Isothermal vitrification (IV) matrices used in experiments:
V1: Trehalose + Dextran;
V2: Trehalose + Dextran + Tween 20;
V3: Trehalose + Dextran + Tween 20 + Glycerol All isothermally vitrified sera samples were stabilized using 150 µL of sera for 250 mg of electrospun matrix. Matrix-preserved samples were either sealed, allowed to diffusively dry in a desiccation chamber at 50% RH, or vacuum dried. Rehydration of the isothermally vitrified samples was done by adding 1.45 mL of ultrapure water to make a 1:10 dilution of the original sample (approximately 100 µL of water was lost during vacuum drying for four hours) and stirring for one hour. Dilution was performed in order to facilitate re-suspending the isothermally vitrified samples and did not influence the results since ultra-low concentrations (picogram to microgram per milliliter) of protein are required for succeeding experiments (SDS-PAGE, ELISA, Western Blot) where samples were diluted five hundred to five thousand times prior to analyses. An identical process for vitrification is conducted for model serum samples, which were used to finalize matrix composition.

Characterization—Protein Concentration

To ensure uniformity of protein concentration between samples, prior to any analysis BCA protein assay was used following the protocol provided by the supplier (Pierce BCA Protein Assay Kit, ThermoFisher Scientific, Waltham, Mass.).

SDS-PAGE

To examine the degradation, aggregation, or depletion following isothermal vitrification, storage and rehydration, SDS-PAGE was conducted as previously described (Andersen et al, 2010, Electrophoresis 31(4):599-610). Briefly, 1 µg serum protein from each sample was denatured in Tris-glycine sample buffer (0.625 M Tris, 10% (w/v) glycerol, 0.05% bromophenol blue, 1% (w/v) SDS) with 1% mercaptoethanol and separated on a precast 4-20% gradient gel (BioRad Laboratories, Inc., Hercules, Calif.) in Tris-glycine buffer (25 mM Tris, 192 mM glycine) with 0.1% SDS.

Silver Stain

In order to visualize minute changes in protein structures (aggregation, degradation etc.) following treatment, silver staining was performed according to the kit manufacturer's instructions (BioRad Laboratories, Inc., Hercules, Calif.).

Western Blots

Western blot analysis was used for the detection of high abundance serum proteins, albumin and haptoglobin, as previously described (Andersen et al, 2010, Electrophoresis 31(4):599-610). Briefly, protein transfer to polyvinylidene difluoride (PVDF) membranes (GE Healthcare Biosciences, Pittsburgh, Pa.), following gel electrophoresis was completed in a Tris-glycine buffer with 12.5% (v/v) methanol. Five percent nonfat dry milk and 0.05% Tween-20 in phosphate buffered saline was then used to block the PVDF membranes overnight. The membranes were then incubated in rabbit anti-human haptoglobin antibody (1:20,000 dilution, ab85846, Abcam, Cambridge, Mass.) or rabbit anti-human serum albumin (Advanced Targeting Systems, San Diego, Calif.) in blocking solution. Later on, the membranes were washed three times with PBS containing 0.05% Tween-20 and incubated in goat anti-rabbit horseradish peroxidase labeled secondary antibody (1:10,000 dilution, 1858415, Pierce) in blocking solution. West Femto chemiluminescence substrate (Pierce) was used to develop the substrates and Kodak ×500 film (Midwest Scientific, Valley Park, Mo.) was used to for imaging.

Enzyme Activity Assay

Enzymatic activity assay was conducted to monitor the stability of the test enzyme, lactate dehydrogenase during matrix optimization following the protocol provided by the supplier (ab102526, Abcam, Cambridge, Mass.). The assay was performed by monitoring the reduction of NAD+ to NADH catalyzed by lactate dehydrogenase. NADH interacts with a probe producing a color that absorbs at 450 nm. The amount of NADH generated is used as a measure of enzyme viability.

ELISA

ELISAs were used to detect selected biomarker stability in isothermally vitrified samples following rehydration. Sandwich ELISA kits for CRP (RAB0096, Sigma-Aldrich, St. Louis, Mo.), PSA (ab188388, Abcam, Cambridge, Mass.), MMP-7 (RAB0369, Sigma-Aldrich, St. Louis, Mo.) and C3a (BMS2089, Affymetrix eBioscience, San Diego, Calif.) were used. The assay was performed using a plate with solid phase antibody bound wells specific to the protein of interest; the samples were incubated in the plate in order for the antibody-antigen complexes to form (capture), washed several times, and then a secondary antibody conjugated to a coenzyme specific to the antibody-antigen complex was added (probe). After several washes, a chromogenic substrate was added to generate a reaction resulting in detectable absorbance changes using a spectrophotometer.

The complete disclosure of all patents, patent applications, and publications, and electronically available material (including, for instance, nucleotide sequence submissions in, e.g., GenBank and RefSeq, and amino acid sequence submissions in, e.g., SwissProt, PIR, PRF, PDB, and translations from annotated coding regions in GenBank and RefSeq) cited herein are incorporated by reference in their entirety. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

What is claimed is:

1. A lyoprotectant matrix comprising:
    a non-woven web comprising:
        fibers comprising:
            an average diameter of 2 µm to 6 µm and comprising:
            at least one lyoprotective carbohydrate;
            at least one polymer; and
            excipients comprising glycerol, Polyethylene glycol (PEG), polysorbate 20, gluconic acid, and glucamine; and
        an apparent pore size of 0.1 µm to 500 µm.

2. The lyoprotectant matrix of claim 1 wherein the lyoprotective carbohydrate comprises a monosaccharide or a disaccharide.

3. The lyoprotectant matrix of claim 1 wherein the lyoprotective carbohydrate comprises trehalose.

4. The lyoprotectant matrix of claim 1 wherein the polymer comprises dextran.

5. A lyoprotectant matrix comprising:
    a non-woven web of fibers consisting essentially of:
        at least one lyoprotective carbohydrate;
        at least one polymer;
        excipients comprising glycerol, polysorbate 20, gluconic acid, and glucamine; and
        water,
    the fibers having an average diameter of 2 µm to 6 µm and the web having an apparent pore size of 0.1 µm to 500 µm.

* * * * *